(12) United States Patent
Wachi et al.

(10) Patent No.: US 7,697,392 B2
(45) Date of Patent: Apr. 13, 2010

(54) OPTICAL PICKUP APPARATUS AND OPTICAL INFORMATION RECORDING AND/OR REPRODUCING APPARATUS

(75) Inventors: Mika Wachi, Hino (JP); Kiyono Ikenaka, Hino (JP); Katsuya Sakamoto, Saitama (JP)

(73) Assignee: Konica Minolta Opto, Inc., Tokyo (JP)

( * ) Notice: Subject to any disclaimer, the term of this patent is extended or adjusted under 35 U.S.C. 154(b) by 939 days.

(21) Appl. No.: 11/487,518

(22) Filed: Jul. 17, 2006

(65) Prior Publication Data

US 2007/0019518 A1 Jan. 25, 2007

(30) Foreign Application Priority Data

Jul. 20, 2005 (JP) .............................. 2005-210429
Dec. 12, 2005 (JP) .............................. 2005-357372

(51) Int. Cl.
*G11B 7/135* (2006.01)
*G11B 7/00* (2006.01)

(52) U.S. Cl. .............................. 369/112.01; 369/44.37; 369/112.23; 369/112.05; 369/112.08

(58) Field of Classification Search .............. 369/44.37, 369/112.01

See application file for complete search history.

(56) References Cited

U.S. PATENT DOCUMENTS

| | | | | |
|---|---|---|---|---|
| 5,917,797 A | * | 6/1999 | Kosoburd | 369/102 |
| 2004/0213136 A1 | * | 10/2004 | Arai et al. | 369/112.23 |
| 2005/0094537 A1 | * | 5/2005 | Ikenaka et al. | 369/112.05 |
| 2005/0111337 A1 | * | 5/2005 | Hatano et al. | 369/112.16 |

* cited by examiner

*Primary Examiner*—Joseph H Feild
*Assistant Examiner*—Nicholas Lee
(74) *Attorney, Agent, or Firm*—Finnegan, Henderson, Farabow, Garrett & Dunner, L.L.P.

(57) ABSTRACT

An optical pickup apparatus which conducts reproducing and/or recording information for a first optical information recording medium by using a light flux having a wavelength $\lambda 1$ ($350 \leq \lambda 1$ (nm) $\leq 480$) and a second optical information recording medium. The optical pickup apparatus comprises an output angle conversion element which is a fixedly arranged single lens which can convert an output angle of the first light flux and the second light flux. The optical detector equipped in the optical pickup apparatus can receive both of the first light flux and the second light flux. And, both optical surfaces of the output angle conversion element are refractive surfaces.

24 Claims, 9 Drawing Sheets

OPTICAL PICKUP APPARATUS AND OPTICAL INFORMATION RECORDING AND/OR REPRODUCING APPARATUS

BACKGROUND OF THE INVENTION

The present invention relates to an optical pickup apparatus and an optical information recording medium recording and/or reproducing apparatus.

In recent years, there has been a rapid progress in the research and development of a high-density optical disk capable of information recording and/or reproduction, using a blue-violet semiconductor laser having a wavelength of about 400 nm. For example, an optical disk for conducting information recording and/or reproduction based on a specification of NA of 0.85 and light source wavelength of 405 nm—a so-called Blu-ray Disc (hereinafter referred to as "BD")—is capable of recording 23 through 27 GB information per layer, as compared to the optical disk having a diameter of 12 cm, the same diameter as that of the DVD (NA: 0.6; light source wavelength: 650 nm, memory size: 7 GB). Further, an optical disk to conduct information recording and/or reproduction based on a specification of NA of 0.65 and light source wavelength of 405 nm—so-called HD DVD (hereinafter referred to as "HD")—is capable of recording 15 through 20 GB information per layer of the optical disk having a diameter of 12 cm. When the BD is used, there is an increase in the comatic aberration caused by the skew of the optical disk. Accordingly, protective substrate is designed thinner than that of the DVD (0.1 mm as compared to 0.6 mm in the case of DVD), whereby the amount of comatic aberration caused by skew is reduced. In the present Specification, such an optical disk will be referred to as a "high-density optical disk".

The value of the optical disk player/recorder as a commercial product cannot be said to be sufficient if information recording and/or reproduction can be conducted only for a high-density optical disk. At present, since a great variety of optical discs such as the DVD and CD (compact disks) for recording information are put on the market. Under that circumstance, adequate information recording and/or reproduction capacity must be ensured for the DVD and CD owned by the user. When this requirement has been met, it becomes possible to enhance the value of the optical disk player/recorder for high-density optical disk as a commercial product. Thus, the optical pickup apparatus mounted on the optical disk player/recorder for high-density optical disk is desired to ensure adequate information recording and/or reproduction for any of the high-density optical disk, DVD and CD.

A method has been proposed to permit adequate information recording and/or reproduction while maintaining compatibility with any of the high-density optical disk, DVD and CD. According to this method, selective switching is carried out between the optical system for high-density optical disk and the optical system for DVD and CD in response to the recording density of the optical disk for information recording and/or reproduction. However, this method requires a plurality of optical systems, and is disadvantageous from the viewpoint of downsizing and cost cutting.

To simplify the structure of the optical pickup apparatus and to reduce the cost, it is preferred in the optical pickup apparatus characterized by compatibility that standardization should be achieved between the optical system for high-density optical disk and the optical system for the DVD and CD wherever possible, thereby minimizing the number of the optical parts constituting the optical pickup apparatus. Further, standardization of the objective optical system laid opposite to the optical disk is the shortest way to simplify the structure of the optical pickup apparatus and to reduce the cost.

However, when an attempt is made to use the standardized objective optical elements to achieve compatibility in the optical pickup apparatus, different light source wavelengths are used in each optical disk. This requires some method to be devised to ensure that a light convergent spot subjected to aberration correction is formed on the optical disk information recording plane.

One of the methods for aberration correction is as follows: The coupling lens displaceable in the direction of optical axis are arranged between the light source and objective optical element. Displacement is performed in the direction of optical axis in response to the kind of the optical disk to be used. The exitance of the light flux entering the objective optical element is changed. However, in order to displace the coupling lens in the direction of optical axis, a separate actuator must be installed. To ensure the installation space, it is necessary to increase the size of the optical pickup apparatus, hence the cost increases. Such a problem remains unsolved. When the liquid crystal element is inserted between the light source and objective optical element, the similar cost problem occurs.

In another embodiment of aberration correction, a wavelength-selective diffraction structure is formed on the optical surface of the coupling lens so as to change the divergence angle or convergence of the luminous flux passing through the coupling lens in response to the kind of passing light flux, and to change the exitance of the light flux entering the objective optical element. In such a structure, the coupling lens is fixed, therefore the actuator is not necessary. However, when a diffraction structure is formed on the optical surface, the light utilization efficiency is reduced. Such a problem remains unsolved.

By contract, in the following Document 1, color aberration correction is carried out by using a doublet collimator.

[Document 1] Official Gazette of Japanese Patent Publication Application Tokkai 2005-122899

However, according to the technology disclosed in the Document 1, a doublet collimator formed by a positive lens bonded onto a negative lens is an essential constituent element. This structure increases the number of optical system manufacturing processes. In the technology disclosed in the Document 1, the optical detector is required by each light source. This leads to an increase in the size of the optical pickup apparatus and an increase in the cost.

The object of the present invention is to solve the aforementioned problems and to provide an optical pickup apparatus and an optical information recording medium recording and/or reproducing apparatus of simple structure capable of adequate aberration correction.

SUMMARY OF THE INVENTION

According to various embodiments, the present teachings can provide an optical pickup apparatus which conducts reproducing and/or recording information for a first optical information recording medium comprising a first protective substrate whose thickness is t1 and conducts reproducing and/or recording information for a second optical information recording medium comprising a second protective substrate whose thickness is t2 (t1≦t2).

The optical pickup apparatus can comprise a first light source, a second light source, an output angle conversion element, an objective optical element, a separation element and an optical detector.

The first light source can emit a first light flux having a wavelength λ1 (350≦λ1 (nm)≦480) for recording and/or reproducing the first optical information recording medium. The second light source can emit a second light flux having a wavelength λ2 (λ1<λ2) for recording and/or reproducing the second optical information recording medium. The output angle conversion element can convert an output angle of the first light flux and the second light flux which is incident to the output angle conversion element. And, the output angle conversion element can be placed fixedly in an optical path which is common to the first light flux and the second light flux and the output angle conversion element is a single lens. The objective optical element can converge the first light flux onto an information recording plane of the first optical information recording medium and the second light flux onto an information recording plane of the second optical information recording medium. The separation element can separate the first light flux and the second light flux which are output from the first light source and the second light source from the first light flux and the second light flux which are reflected on the information recording planes of the first optical information recording medium and the second optical information recording medium. The optical detector can receive both of the first light flux and the second light flux which are reflected on the information recording planes of the first optical information recording medium and the second optical information recording medium.

Both optical surfaces of the output angle conversion element are refractive surfaces.

According to various embodiments, the present teachings also can provide an optical pickup apparatus which conducts reproducing and/or recording information for a first optical information recording medium comprising a first protective substrate whose thickness is t1 and conducts reproducing and/or recording information for a second optical information recording medium comprising a second protective substrate whose thickness is t2 (t1≦t2).

The optical pickup apparatus can comprise a first light source, a second light source, an output angle conversion element, an objective optical element, a separation element and an optical detector.

The first light source can emit a first light flux having a wavelength λ1 (350≦λ1 (nm)≦480) for recording and/or reproducing the first optical information recording medium. The second light source can emit a second light flux having a wavelength λ2 (λ1≦λ2) for recording and/or reproducing the second optical information recording medium. The output angle conversion element can convert an output angle of the first light flux and the second light flux which is incident to the output angle conversion element, wherein the output angle conversion element is placed fixedly in an optical path which is common to the first light flux and the second light flux and the output angle conversion element is a single lens. The objective optical element can converge the first light flux onto an information recording plane of the first optical information recording medium and the second light flux onto an information recording plane of the second optical information recording medium. The separation element can separate the first light flux and the second light flux which are output from the first light source and the second light source from the first light flux and the second light flux which are reflected on the information recording planes of the first optical information recording medium and the second optical information recording medium. The optical detector can receive the first light flux and/or the second light flux which are reflected on the information recording planes of the first optical information recording medium and the second optical information recording medium.

Both optical surfaces of the output angle conversion element are refractive surfaces. Also, the following formula is satisfied:

$$0.9 \times l1 \leq l2 \leq 1.1 \leq l1,$$

where l1 represents an optical path length between the first light source and the output angle conversion element and l2 represents an optical path length between the second light source and the output angle conversion element.

According to various embodiments, the present teachings also can provide an optical pickup apparatus which conducts reproducing and/or recording information for a first optical information recording medium comprising a first protective substrate whose thickness is t1 and conducts reproducing and/or recording information for a second optical information recording medium comprising a second protective substrate whose thickness is t2 (t1≦t2).

The optical pickup apparatus can comprise a first light source, a second light source, an output angle conversion element and an objective optical element.

The first light source can emit a first light flux having a wavelength λ1 (350≦λ1 (nm)≦480) for recording and/or reproducing the first optical information recording medium. The second light source can emit a second light flux having a wavelength λ2 (λ1<λ2) for recording and/or reproducing the second optical information recording medium. The output angle conversion element can convert an output angle of the first light flux or the second light flux which is incident to the output angle conversion element, wherein the output angle conversion element is placed fixedly in an optical path which is common to the first light flux and the second light flux and the output angle conversion element is a single lens. The objective optical element can converge the first light flux onto an information recording plane of the first optical information recording medium and the second light flux onto an information recording plane of the second optical information recording medium.

Both optical surfaces of the output angle conversion element can be refractive surfaces. The first light flux can be incident to the objective optical element as a convergent light flux.

The aforementioned object of the present invention can also be achieved by the following structures:

1) An optical pickup apparatus which conducts reproducing and/or recording of information for a first optical information recording medium comprising a first protective substrate whose thickness is t1, and for a second optical information recording medium comprising a second protective substrate whose thickness is t2 (t1≦t2), the optical pickup apparatus comprising:

a first light source to emit a first light flux having a wavelength λ1 (350 nm≦λ1≦480 nm) for recording and/or reproducing the information of the first optical information recording medium;

a second light source to emit a second light flux having a wavelength λ2 (640 nm≦λ2≦680 nm) for recording and/or reproducing the information of the second optical information recording medium;

an output angle conversion element to convert an output angle of the incoming first and second light fluxes, wherein the output angle conversion element is placed fixedly in an optical path which is common to the first and second light fluxes;

an objective optical element to converge the first light flux onto an information recording plane of the first optical information recording medium and the second light flux onto an information recording plane of the second optical information recording medium, a separation element to separate the first and second light fluxes output from the first and second light sources, from the first and second light fluxes reflected on the information recording planes of the first and second optical information recording medium, wherein the separation element is arranged in the optical path between the first and second light sources and output angle conversion element;

an optical detector to receive both of the first light flux and the second light flux which are reflected on the information recording planes of the first optical information recording medium and the second optical information recording medium, and wherein both optical surfaces of the output angle conversion element are refractive surfaces.

The structure (1) uses a coupling lens (including a collimator) as an output angle conversion element wherein both surfaces are made of refractive surfaces. This arrangement mitigates reduction in the amount of light, and allows adequate spot light to be converged onto the information recording plane of the optical information recording medium. Further, only one output angle conversion element is used and the number of the light receiving elements can be reduced. Thus, a compact, low-cost optical pickup apparatus can be provided. Such an optical pickup apparatus can be obtained by the method of designing the optical system for the optical pickup apparatus to be described below:

A method for designing an optical system for the optical pickup apparatus wherein reproduction and/or recording of information for the first optical information recording medium is conducted by the light flux having a wavelength $\lambda 1$ emitted from the light source, using the objective optical element and the fixedly arranged output angle conversion element, and reproduction and/or recording of information for the second optical information recording medium is conducted by the light source having a wavelength $\lambda 2$ ($\lambda 1 < \lambda 2$) emitted from the light source; the method for designing the optical system comprises:

a first process for setting the desired magnification m1 of the objective optical element for either the first optical information recording medium or the second optical information recording medium;

a second process for setting a desired magnification Mt of the optical system in the entire optical system for the aforementioned optical pickup apparatus when the light source is used at the time of setting the m1;

a third process for determining the magnification Mcn of the output angle conversion element having the optical surface constituted by the refractive surface when the light source is used at the time of setting the m1, based on the magnification m1 and magnification Mt;

a fourth process for determining the magnification m2 of the objective optical element for the other of the first or second optical information recording medium, based on the magnification Mt and Mcn;

a fifth process for verifying whether or not a predetermined standard is met in at least one of the following characteristics (a) through (d) with respect to the optical system designed based on the aforementioned magnifications m1, m2, Mt and Mcn;

wherein, if it has been determined in the fifth process that the standard is not met, the first through fourth processes are carried out based on the newly established magnification m1:

(a) Amount of change in wavefront aberration when the ambient temperature has risen by a predetermined temperature;

(b) Amount of comatic aberration having occurred when the objective optical element has tracked a predetermined distance;

(c) Operation distance between the objective optical element and the first optical information recording medium; and (d) Amount of change in wavefront aberration when the wavelength of the light flux to be used has fluctuated a predetermined amount The following describes the conventional method of designing the optical system for optical pickup apparatus capable of information recording and/or reproducing compatibly using different optical information recording media (also called the optical disks). In this case, when the optical system for optical pickup apparatus contains a plurality of optical elements such as coupling lenses and objective optical elements, it is difficult to determine the design specifications of these optical elements in one operation. Thus, the conventional method determines the magnification of the objective optical element at first when the different optical disks are used.

To put it more specifically, the magnifications m1 and m2 of the objective optical element for the first optical information recording medium and second optical information recording medium are set in the process A. Then in the process B, at least one of the aforementioned four characteristics (a) through (d) is verified to check if a predetermined standard is met or not. If the standard is not met, the system goes back to the process A. New values are set as the magnifications m1 and m2, and the process B is executed. If magnifications m1 and m2 meet the predetermined standard, the magnification Mcn of the coupling lens and the magnification Mt of the optical system in the entire optical system for the optical pickup apparatus are determined in the process C, based on the aforementioned conditions.

However, if the magnifications m1 and m2 of the objective optical element of the first optical information recording medium and second optical information recording medium are set first in the conventional method, a problem arises wherein the range of selecting the magnification Mcn of the coupling lens is restricted. Especially when common one optical detector is used for several light flux wavelengths for the purpose of cost reduction and compact configuration of the optical pickup apparatus, the optical path length from the first light source to the optical detector must be made to conform to the optical path length from the second light source to the optical detector. In this case, when the range of magnification of the coupling lens is limited, it is impossible to achieve satisfactory correction of color aberration in terms of practical designing—if not theoretically, but realistically—using the coupling lens of the refractive surface alone, without the coupling lens being provided with a diffraction structure or without displacement of the coupling lens being made in the direction of optical axis. This will inevitably lead to the high cost and large size of an optical pickup apparatus.

According to the aforementioned designing method, by contrast, the magnification m1 of the objective optical element is set in the first process for either the first optical information recording medium or the second optical information recording medium. In the second process, magnification Mt in the entire optical system is set. The Mt is determined based on the specification of the pickup apparatus such as the distance between the objective lens and coupling lens, the distance between the light source and coupling lens, and the pickup apparatus being used for recording or for reproduction. The third process determines the magnification Mcn of the output angle conversion element having the optical surface formed of the refractive surface, based on such conditions. Further, the Mcn must be set with due consideration given to the layout of the optical element between the coupling lens and objective lens, in addition to m1 and Mt. Accordingly, in the second process, the assumption that the output angle conversion element is formed of the refractive surface, and is fixedly arranged is set in advance. Therefore, unlike the magnification of the optical system including the output angle conversion element provided with the optical surface including the diffraction structure, the magnification Mcn can be determined uniquely. The fourth process determines the magnification m2 of the objective optical element for the other of the first or second optical information recording medium based on the magnification Mt and Mcn. Thus, when all the design values of the aforementioned parameters of the optical system for optical pickup apparatus are determined temporarily, the output angle conversion element (e.g. coupling lens) whose optical surface formed of the refractive surface alone and which is used fixedly has been established necessarily.

However, in order to determine if the design value of the optical system determined temporarily in this manner is adequate or not, it is necessary to verify whether or not the predetermined standard is met for the aforementioned four characteristics (a) through (d). Therefore, in the fifth process, at least one of the aforementioned characteristics (a) through (d) is verified for the optical system for optical pickup apparatus designed based on the magnification m1, m2, Mt and Mcn having been determined. The fifth step is taken to determine whether or not the predetermined standard is met. If the standard is not met, the system goes back to the first process, and a different value is set as the magnification m1. Further, the optimum value can be obtained by repeating the aforementioned second through fourth processes.

The present invention described above permits easy designing of an optical system for optical pickup apparatus characterized by excellent optical characteristics, wherein this optical system contains an optical surface made up of a refractive surface and ensures compatibility among a plurality of optical disks containing the divergence angle conversion element fixedly arranged.

Thus, for the aforementioned optical system for optical pickup apparatus designed based on the magnification m1, m2, Mt and Mcn having been determined, all the four characteristics (a) through (d) are verified in the aforementioned the fifth process. If this verification is made for all the four characteristics (a) through (d), it is possible to provide an optical system better suited for an the optical pickup apparatus.

The optical system for optical pickup apparatus designed by the aforementioned designing method preferably comprises:

an output angle conversion element, made up of a refractive surface alone, fixedly arranged in the optical path through which both the light flux having a wavelength of $\lambda 1$ and that having a wavelength of $\lambda 2$ ($\lambda 1 < \lambda 2$) pass; and an objective optical element for converging the light flux having passed through the output angle conversion element onto the information recording plane of the first optical information recording medium in the form of the first convergent spot having a diameter d1 or onto the information recording plane of the second optical information recording medium in the form of the second convergent spot having a diameter d2 (d1<d2).

To be more specific, the aforementioned designing method makes it possible to design an optical system for optical pickup apparatus that permits recording and/or reproduction of information compatibly between a high-density optical disk and other optical disks using an output angle conversion element (e.g. coupling lens) fixedly arranged whose optical surface is made of an refractive surface alone.

The following embodiment describes the conditions which ensure that the optical pickup apparatus that permits recording and/or reproduction of information compatibly between a high-density optical disk and another optical disk can comprise the output angle conversion element fixedly arranged whose optical surface are the refractive surface and an optical detector to be shared for both optical information recording media (or the optical distance between the first light source and output angle conversion element is almost equal to the optical distance between the second light source and the output angle conversion element).

The optical pickup apparatus according to the structure (2) is the optical pickup apparatus described in the structure (1) and is further characterized in that the objective optical element meets the following conditional expression:

$$0.5 \leq M1 < 1 \text{ (where } |m1| \leq 0.06) \tag{1}$$

where M1 represents m2/m1, m1 represents an optical magnification of the objective optical element for wavelength $\lambda 1$ (for recording and/or reproduction of the information of the first optical information recording medium), and m2 represents an optical magnification of the objective optical element for wavelength $\lambda 2$ (for recording and/or reproduction of the information of the second optical information recording medium).

When the magnification ratio M1 is determined as described above, the objective optical element provides more appropriate conversion of the divergent light or convergent light having a wavelength of $\lambda 1$ and a wavelength of $\lambda 2$ onto the respective optical information recording media. It becomes also possible to reduce the comatic aberration caused when the objective optical element has tracked. The magnification ratio M1 does not exceed 1 since the both optical surface of the output angle conversion element are the refractive surfaces.

The optical pickup apparatus according to the structure (3) is the optical pickup apparatus described in the structure (1) and is further characterized in that the objective optical element meets the following conditional expression:

$$m1 - 0.06 \leq m2 \text{ (where } 0 \leq m1, m2 \leq 0) \tag{2}$$

The objective optical element ensures that the divergent light or collimated light having a wavelength of $\lambda 1$ and the convergent light or collimated light having a wavelength of $\lambda 2$ are converged onto the respective optical information recording media. It becomes also possible to reduce the comatic aberration caused when the objective optical element has tracked.

If the magnification M1 is less than the upper limit of the equation (1), and magnification m1 does not exceed the upper limit of the equation (2), the working distance can be kept at 0.4 mm or more when the second optical information recording medium is used. Further, when the magnification ratio M1 is equal to or greater than the lower limit of the equation (1) and the magnification m1 is equal to or greater than the lower limit of the equation (2), the temperature characteristic does not exceed the Marechal limitation (Marechal criterion) even if the f is somewhat long as in f=3.1 and the Marechal limitation is not easily exceeded at the time of tracking even if the f is somewhat short as in f1=1.6. Therefore, this is preferred.

To be more specific, when the equations (1) and (2) are met, it is possible to provide an optical pickup apparatus of higher performances equipped with an output angle conversion element fixedly arranged whose both optical surfaces are the refractive surfaces, and an optical detector for common use for both the optical information recording media.

The optical pickup apparatus of structure (4) is the optical pickup apparatuses described in the structure (2) or (3), and is further characterized in that the objective optical element meets the following conditional expression:

$$1.75 \text{ mm} \leq f1 \leq 4 \text{ mm} \tag{3}$$

where f1 represents the focal distance of the objective optical element with respect to the light flux having a wavelength of λ1.

If f1≦4 mm, it is possible to achieve a further reduction in the size of a compact pickup apparatus wherein use of the output angle conversion element is shared by both the light of wavelength λ1 and wavelength of λ2. It is possible to provide an objective optical element that can be implemented if 1.75 mm≦f1.

The optical pickup apparatus of structure (5) is the optical pickup apparatus described in the structure (4), and is further characterized in that the output angle conversion element is designed to emit the convergent light or collimated light for first light flux entering the output angle conversion element. Accordingly, when the light flux emitted from the output angle conversion element is allowed to enter the objective optical element, the light flux converges properly onto the optical information recording medium.

The optical pickup apparatus of structure (6) is the optical pickup apparatus described in the structure (5), and is further characterized in that a ring-shaped step structure centering on the optical axis is provided on at least one surface of the objective optical element, and the average depth d of the step structures parallel to the optical axis of the step structure meets the following conditional expression:

$$3 \times \lambda 1/(n1-1) \leq d \leq 2 \times \lambda 2/(n2-1) \tag{4}$$

Accordingly, the light fluxes having wavelengths of λ1 and λ2 can be emitted from the objective optical element with high diffraction efficiency.

The optical pickup apparatus of structure (7) is the optical pickup apparatus described in the structure (5), and is further characterized in that a ring-shaped step structure centering on the optical axis is provided on at least one surface of the objective optical element, and the average depth d of the step structures parallel to the optical axis of the step structure meets the following conditional expression:

$$1 \times \lambda 2/(n2-1) \leq d \leq 2 \times \lambda 1/(n1-1) \tag{5}$$

Accordingly, the light fluxes having wavelengths of λ1 and λ2 can be emitted from the objective optical element with high diffraction efficiency.

The optical pickup apparatus of structure (8) is the optical pickup apparatus described in the structure (2), and is further characterized in that the optical pickup apparatus comprises a third light source for emitting the third light flux having a wavelength of λ3 (730 nm≦λ3≦780 nm), and the third light flux having been emitted is converged by the objective optical element onto the information recording plane of the third optical information recording medium comprising the protective substrate having been a thickness of t3 (t2<t3). Thus, the information of third information recording medium is recorded and/or reproduced. Also, in the structure (8), the optical detector is designed to receive the first through third light fluxes reflected from the information recording plane of the first through third optical information recording media, and to meet the following conditional expression:

$$0.01 \leq m1 \tag{6}$$

Thus, the optical system magnification for the light flux having a wavelength of λ3 in the objective optical element can be made to be closer to 0. This arrangement reduce the comatic aberration caused by tracking of the objective optical element. Since one detector receives light fluxes of three different wavelengths, a more compact optical pickup apparatus can be produced.

The optical pickup apparatus of (9) is the optical pickup apparatus described in the structure (6), and is further characterized in that the optical pickup apparatus comprises a third light source for emitting the third light flux having a wavelength of λ3 (730 nm≦λ3≦780 nm), and the third light flux having been emitted is converged by the objective optical element onto the information recording plane of the third optical information recording medium containing the protective substrate whose thickness is t3 (t1<t3). Thus, the information of the third information recording medium is recorded and/or reproduced. The optical detector is designed to receive the first through third light fluxes reflected from the information recording plane of the first through third optical information recording media, and to meet the following conditional expression:

$$0.01 \leq m1 \tag{6}$$

Thus, the optical system magnification of the objective optical element for the light flux having a wavelength of λ3 can be made to be closer to 0. This arrangement can reduce the comatic aberration caused by tracking of the objective optical element. Since one detector receives light fluxes of three different wavelengths, a more compact optical pickup apparatus can be produced.

The optical pickup apparatus of structure (10) is the optical pickup apparatus described in the structure (3), and is further characterized in that the optical pickup apparatus comprises a third light source for emitting the third light flux having a wavelength of λ3 (730 nm≦λ3≦780 nm), and the third light flux having been emitted is converged by the objective optical element onto the information recording plane of the third optical information recording medium containing the protective substrate whose thickness is t3 (t1<t3). Thus, the information of the third information recording medium is recorded and/or reproduced. The optical detector is designed to receive the first through third light fluxes reflected from the information recording plane of the first through third optical information recording media, and to meet the following conditional expression:

$$0 \leq m1 < 0.01 \tag{7}$$

Thus, bringing the magnitude m1 to be closer to 0 improves the tracking characteristic when light flux having a wavelength of λ1 enters the objective optical element.

The optical pickup apparatus of structure (11) is the optical pickup apparatus described in the structure (7), and is further characterized in that the optical pickup apparatus contains a third light source for emitting the third light flux having a wavelength of λ3 (730 nm≦λ3≦780 nm), and the third light flux having been emitted is converged by the objective optical element onto the information recording plane of the third optical information recording medium containing the protective substrate whose thickness is t3 (t2<t3). Thus, the information of the third information recording medium is recorded and/or reproduced. The optical detector is designed to receive the first through third light fluxes reflected from the information recording plane of the first through third optical information recording media, and to meet the following conditional expression:

$$0 \leq m1 < 0.01 \qquad (7)$$

Thus, bringing the magnitude m1 to be closer to 0 improves the tracking characteristic when light flux having a wavelength of λ1 enters the objective optical element.

The optical pickup apparatus of structure (12) is the optical pickup apparatus described in any one of the structures (1) through (11), and is further characterized in that a liquid crystal element capable of changing the amount in the difference of the phase given to the transmitted light flux, depending on the state of voltage application, is provided between the output angle conversion element and the objective optical element.

The present invention allows the liquid crystal element to provide free control of the state of the phase of the transmitted light flux. This makes it possible to remove the spherical aberration included in the convergent spot to be formed, even if there is a difference between the divergence angle of the light flux emitted by the output angle conversion element and the optimum incoming angle for the objective optical element. This feature increases the degree of freedom in the arrangement of the light source (optical path length determined) of the optical pickup apparatus, and in the optical element design and layout. It should be noted that some of the liquid crystal elements are disclosed in the U.S. Pat. No. 6,078,554, for example.

The optical pickup apparatus of structure (13) is the optical pickup apparatus described in the structure (12), and is further characterized in that the liquid crystal element corrects the spherical aberration produced between the convergent spot of a certain information recording plane and that of another information recording plane, when the information of the optical information recording medium is recorded and/or reproduced and the first optical information recording medium comprises a plurality of information recording planes. Thus, when the first light flux is applied to a plurality of recording planes of the first optical information recording medium, the adverse effect of the inclination of the optical information recording medium and comatic aberration caused by tracking cannot be ignored in the movement of the objective optical element in the direction of optical axis. To solve this problem, a phase difference is applied to the light flux transmitted by the liquid crystal element, and the position of convergence is changed, whereby a preferable spot is formed.

The optical pickup apparatus of structure (14) is the optical pickup apparatus described in the structure (12) or (13), and is further characterized in that, when the information of the third optical information recording medium is recorded and/or reproduced, the liquid crystal element converts the light flux emitted from the output angle conversion element as a divergent light flux, into the collimated light flux or finite convergent light flux, which is then made to enter the objective optical element.

When the working distance and tracking characteristic are taken into account, it is a common practice to allow the infinite collimated light to enter the objective optical element. Entry of the infinite collimated light is not necessarily preferred, depending on the wavelength, refractive index of the optical element, dispersion, design of the optical element and layout (optical path length and arrangement) of the optical pickup apparatus. Especially when compatibility among a plurality of optical information recording media is taken into account, divergent light is often made to enter the objective optical element to correct the spherical aberration in the case of the light flux having a long wavelength and the optical information recording medium having a thick protective substrate. This reduces the working distance and causes much comatic aberration to occur due to tracking.

When a common output angle conversion element is used, it becomes difficult to arrange such a structure as to permit the collimated light to be emitted in the case of light flux having a longer wavelength, because of the difference in wavelength and the restriction on the optical path length. This problem can be solved by moving the output angle conversion element in the direction of optical axis or by providing a diffraction structure. However, such a solution involves the problem of an increase in costs and space, and a decrease in amount of light.

According to the structures (12), (13) and (14), even if there is a difference between the output angle of the light flux emitted by the output angle conversion element and the optimum incoming angle for the objective optical element, it is possible to remove the spherical aberration contained in the convergent spot to be formed, by free control of the phase state in the transmitted light flux by the liquid crystal element. This method has an advantage of increasing the degree of freedom in the arrangement (optical path length to be determined) of the light source and the design and layout of the optical element in the optical pickup apparatus.

In this case, since the protective substrate has a thickness of t1<t3, if there is no correction at all, the light flux of the wavelength λ3 will produce over spherical aberration greater than spherical aberration of the light flux having a wavelength of λ1 on the information recording plane of the third optical information recording medium. However, if the light flux having a greater output angle (divergence angle) is made to enter the objective optical element through the liquid crystal element, then the over spherical aberration is cancelled.

The optical pickup apparatus of structure (15) is the optical pickup apparatus described in the structure (12) or (13), and is further characterized by that the liquid crystal element provides phase difference so that convergent spot having more over spherical aberration is formed on the information recording plane of the third optical information recording medium compared to the spherical aberration of the convergent spot converged by the objective optical element without providing phase difference to the divergent light flux by the liquid crystal element.

According to the structure (15), since the protective substrate has a thickness of t1<t3, the light flux of the wavelength λ3 will produce the over spherical aberration greater than that of the light flux having a wavelength of λ1 on the information recording plane of the third optical information recording medium. However, this over spherical aberration can be cancelled by the under spherical aberration produced by the liquid crystal element.

The optical pickup apparatus of structure (16) is the optical pickup apparatus described in the structure (12) or (15), and is further characterized in that the liquid crystal element is capable of applying a non-rotational-symmetric phase difference with respect to optical axis, and corrects the comatic aberration of the convergent spot formed on the information recording plane of the optical information recording medium, when the information for the first through third optical information recording medium is recorded and/or reproduced.

In a commonly used optical pickup apparatus, an objective optical element tracking operation is essential in the information reproduction and recording for the information recording plane of optical information recording medium. This is inevitably accompanied by comatic aberration. This phenomenon tends to be more remarkable as the light flux entering the objective optical element is closer to the finite divergent light.

One of the well-known design philosophies to solve this problem is to adjust the sinusoidal conditions of the objective optical element. However, this is accompanied by a limited range in the solution of the problem. Especially, the comatic aberration occurs more conspicuously as the wavelength is shorter. When the structure (16) is employed, despite occurrence of a tracking coma, the coma is removed by correction of the asymmetrical correction with respect to optical axis, whereby an preferable convergent spot is formed.

The optical pickup apparatus of structure (17) is the optical pickup apparatus described in one of the structures (12) through (16), and is further characterized in that the liquid crystal element is capable of applying a non-rotational-symmetric phase difference with respect to optical axis, and corrects the astigmatism of the convergent spot formed on the information recording plane of the optical information recording medium, when the information for the aforementioned first through third optical information recording medium is recorded and/or reproduced.

When an optical element is manufactured, a rotational symmetric element is not necessarily produced, and astigmatism may occur due to the multi-refraction of the lens material or a slight difference at the time of manufacturing. A light source may also contain such astigmatism. To solve this problem, various methods have been devised, for example, by rotating the optical element and adjusting the astigmatism at the time of assembling the optical pickup apparatus. However, there is a limit to the range wherein the problem can be solved by such methods. Further, the optical element does not necessarily have a rotationally symmetric form.

According to the structure (17), an asymmetrical phase difference with respect to optical axis is given by the liquid crystal element, whereby astigmatism is corrected, and a preferable convergent spot is formed. It should be added that the amount of correction can be determined separately by calibration of each of the optical pickup apparatuses.

The aforementioned structure provides an optical pickup apparatus and an optical information recording medium recording and/or reproducing apparatus of simple structure which is capable of appropriate aberration correction.

DETAILED DESCRIPTION OF THE PREFERRED EMBODIMENT

Figure 1:
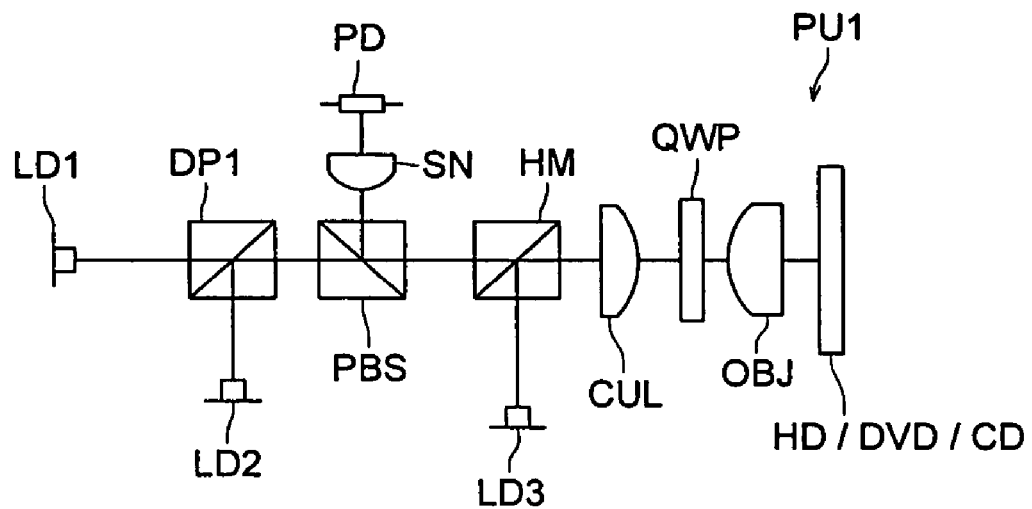
FIG. 1 is a schematic diagram showing the structure of the optical pickup apparatus PU1 as the present embodiment capable of recording and/or reproduction of the information for the HD, DVD and CD as different optical information recording media (also called the optical disks)

The optical pickup apparatus of the present invention is an optical pickup apparatus which conducts reproducing and/or recording of information for a first optical information recording medium containing a protective substrate whose thickness is t1 and a second optical information recording medium containing a protective substrate whose thickness is t2 (t1<t2).

The optical pickup apparatus comprises at least a first light source, a second light source, an output angle conversion element, an objective optical element, a separation element and an optical detector.

The first light source emits a first light flux having a wavelength $\lambda 1$ ($350 \leq \lambda 1$ (nm) $\leq 480$) for recording and/or reproducing the information of the first optical information recording medium.

The second light source emits a second light flux having a wavelength $\lambda 2$ ($\lambda 1 < \lambda 2$) for recording and/or reproducing the information of second optical information recording medium.

The output angle conversion element is a single lens for converting the output angle of the incoming first and second light fluxes. The output angle conversion element is placed fixedly in an optical path which is common to the first and second light fluxes. Both the optical surfaces of the output angle conversion element transmitted by the first and second light fluxes are refractive surfaces. The output angle conversion element is preferably structured to emit convergent light in the case of the first light flux entering the output angle conversion element, and the convergent light or collimated light (preferably convergent light in particular) in the case of the second light flux entering the output angle conversion element. The example of the output angle conversion element is a coupling lens including a collimator lens.

The objective optical element converges the first light flux onto the information recording plane of the first optical information recording medium and the second light flux onto the information recording plane of the second optical information recording medium. Both of the optical surfaces of the objective optical element can be refractive surfaces. Alternatively, at least one of the optical surfaces may be provided with an optical path length difference providing structure (e.g. ring-shaped step structure centering on the optical axis) such as a diffractive structure. Preferably, at least one of the optical surfaces is provided with an optical path length difference providing structure such as a diffractive structure. The color aberration of the first and second light fluxes caused by the output angle conversion element is corrected by the objective optical element.

The separation element separates the first and second light fluxes output from the first and second light sources, from the first and second light fluxes reflected on the information recording planes of the first and second optical information recording media. The separation element is preferably arranged in the optical path between the first and second light sources and output angle conversion element. The example of the separation element is a dichroic prism and so on.

The optical detector is preferably designed as a common optical detector for receiving both of the reflected first and second light fluxes. However, two different optical detectors can be also used, provided that the following equation is satisfied:

$$0.9 \times l1 \leq l2 \leq 1.1 \times l1$$

where l1 represents the optical path length from the first light source to the output angle conversion element, and l2 represents the optical path length from the second light source to the output angle conversion element. It is preferred that the following equation should be satisfied.

$$0.95 \times l1 \leq l2 \leq 1.05 \times l1$$

Further, t1 is preferably 0.075 mm or more and is preferably 0.125 mm or less, or is preferably 0.5 mm or more and is preferably 0.7 mm or less. t2 is preferably 0.5 mm or more and is preferably 0.7 mm or less, or is preferably 1.0 mm or more and is preferably 1.3 mm or less. A BD or HD is preferably used as the first optical information recording medium. A DVD is preferably used as the second optical information recording medium, and a CD can also be used. It is particularly preferred that an HD as the first optical information recording medium, and a DVD as the second optical information recording medium should be used in combination.

It should be noted that the $\lambda 2$ is preferably 640 nm or more and is preferably 680 nm or less when the DVD is used as the second optical information recording medium. When the CD is used as the second optical information recording medium, $\lambda 2$ is preferably 730 nm or more and is preferably 780 nm or less.

In the present specification, "the objective optical element" refers to "the optical element" including the lens having a function of convergence to be arranged at the position closest to the optical information recording medium and opposite to the optical information recording medium, when optical pickup apparatus is loaded with the optical information recording medium. Also, "the objective optical element" also is the group of lenses including the aforementioned "optical element", the group of lenses being able to be moved by the actuator at least in the direction of optical axis. Accordingly, "the objective optical element" can be the group of lenses or a single lens. It should be noted that there is no restriction to the material of the objective optical element; various materials such as glass and plastics can be used. Further, that "the output angle conversion element is placed fixedly in an optical path" means that the output angle conversion element is arranged so that the distance from the light source for emitting the wavelengths $\lambda 1$ and $\lambda 2$ to the output angle conversion element in the direction of optical axis does not change during the time of recording and/or reproduction for each of the first and second optical information recording media or at the time of recording and/or reproduction for each of the first through third optical information recording media. Further, the term "converge" refers to the act of converging the incoming light flux to the minute spot of the diffraction limit. The "the optical detector to receive both of the first light flux and the second light flux" or "optical detector for use of both the HD and DVD" refers to the optical detector comprising the light receiving surface wherein at least the light receiving surface is commonly used for the light fluxes.

The first light flux from the first light source preferably enters the objective optical element as convergent light. The second light flux from the second light source preferably enters the objective optical element as collimated light or convergent light. More preferably, the second light flux is convergent light.

Further, the following conditional expression (1) is preferably satisfied.

$$0 \leq M1 < 1 \text{ (where } |m1| \leq 0.091) \tag{1}$$

where M1 is m2/m1, m1 represents the optical magnification of the objective optical element for the wavelength $\lambda 1$ (at the time of recording and reproducing the information of the first optical information recording medium), m2 represents the optical magnification of the objective optical element for the wavelength $\lambda 2$ (at the time of recording and reproducing the information of the second optical information recording medium). It is preferred that $m1 \neq m2$, although this is inherently expressed in the aforementioned conditional expression. The m1 is preferably greater than 0.

More preferably, the following conditional expression (2) should be met.

$$0.5 \leq M1 < 1 \text{ (where } |m1| \leq 0.08) \tag{2}$$

Still more preferably, the following conditional expression (2)' should be met.

$$0.5 \leq M1 < 1 \text{ (where } |m1| \leq 0.06) \tag{2}'$$

If the conditional expression (1) is not met, the conditional expression (3) is preferably met:

$$m1 - 0.06 \leq m2 \text{ (where } 0 \leq m1, m2 \leq 0) \tag{3}$$

In the conditional expression (3), m1 is still more preferably greater than 0.

In addition, the following conditional expression (4) is preferably met:

$$1.60 \leq f1 \text{ (mm)} \leq 4 \tag{4}$$

where f1 represents the focal length of the objective optical element for the light flux having a wavelength $\lambda 1$.

More preferably, the following conditional expression (4)' is met:

$$1.75 \leq f1 \text{ (mm)} \leq 4 \tag{4}'$$

When the objective optical element is provided with the optical path length difference providing structure, the average depth d of step of the optical path difference providing structure, the step being parallel to the optical axis preferably meets the following conditional expression (5) or (6): The average depth of step of the optical path difference providing structure can be defined as the average value of the depth for all the steps of the optical path length difference providing structure.

$$3 \times \lambda 1/(n1-1) \leq d \leq 2 \times \lambda 2/(n2-1) \quad (5)$$

$$1 \times \lambda 2/(n2-1) \leq d \leq 2 \times \lambda 1/(n1-1) \quad (6)$$

Further, the optical pickup apparatus may be provided with a third light source for emitting the third light flux having a wavelength of λ3 (λ2<λ3). In this case, the third light flux having been emitted is converged onto the information recording plane of the third optical information recording medium with a protective substrate having a thickness of t3 (t2<t3) by the objective optical element, whereby the information of the third optical information recording medium is recorded and/or reproduced. In this case, at least two of the first, second and third light fluxes preferably enter the objective optical element as convergent light. In this case, an HD is preferably the first optical information recording medium, a DVD is preferably the second optical information recording medium and CD is preferably the third optical information recording medium. Accordingly, λ3 is preferably 730 nm or more and is preferably 780 nm or less. If an HD is the first optical information recording medium and a DVD is the second optical information recording medium, the first light flux preferably enters the objective optical element as convergent light and the second light flux preferably enters the objective optical element as collimated light or convergent light, particularly preferred that it is convergent light.

When the optical pickup apparatus comprises a third light source, the optical detector may be a common optical detector for receiving all of the first through third light fluxes reflected from the information recording plane of the first through third optical information recording media. Alternatively, the optical detector for receiving the third light flux can be another optical detector different from that for receiving the first and second light fluxes.

Further, when the optical pickup apparatus comprises a third light source, the following conditional expression (7) is preferably met:

$$0.01 \leq m1 \quad (7)$$

The optical information recording and/or reproducing apparatus of the present invention comprises the optical disk drive apparatus equipped with the aforementioned optical pickup apparatus.

The following describes the optical disk drive apparatus equipped in the optical information recording and/or reproducing apparatus: The optical disk drive apparatus is available in two types. One is the type wherein only the tray that can be held with an optical disk mounted thereon is removed outside from the optical information recording and/or reproducing apparatus proper incorporating the optical pickup apparatus and others. Another is the type wherein each optical disk drive apparatus proper accommodating the optical pickup apparatus and others is taken out.

The optical information recording and/or reproducing apparatus using each of the aforementioned methods is generally equipped with the following constituent members, without being restricted thereto. For example, it can be equipped with an optical pickup apparatus drive source such as a seek motor for moving the optical pickup apparatus, optical pickup apparatus incorporated in a housing or the like, toward the inner or outer periphery of the optical disk; an optical pickup apparatus transfer device provided with a guide rail for guiding the optical pickup apparatus housing toward the inner or outer periphery of the optical disk; and a spindle motor for driving the optical disk.

In the former type, the apparatus is preferably equipped with a tray that can be carried with the optical disk mounted thereon and a loading mechanism for sliding the tray, in addition to the aforementioned constituent members. In the latter type, no tray or loading mechanism is preferably provided. The constituent members are preferably arranged in drawer equivalent to the chassis that can be pulled outside.

EMBODIMENT OF THE INVENTION

The following describes the embodiments of the present invention with reference to drawings: FIG. 1 is a schematic diagram showing the structure of the optical pickup apparatus PU1 as the present embodiment capable of recording and/or reproducing the information for the HD, DVD and CD as different optical information recording media (also called the optical disks). This optical pickup apparatus PU1 can be mounted on the optical information recording and/or reproducing apparatus.

The optical pickup apparatus PU1 comprises:

a first semiconductor laser LD1 actuated at the time of information recording and/or reproduction for the HD to emit the blue-violet laser light flux (first light flux) having a wavelength of λ1=407 nm;

a second semiconductor laser LD2 actuated at the time of information recording and/or reproduction for the DVD to emit the red laser light flux (second light flux) having a wavelength of λ2=655 nm;

a third semiconductor laser LD3 actuated at the time of information recording and/or reproduction for the CD to emit the infrared laser light flux (third light flux) having a wavelength of λ3=785 nm;

an optical detector PD for common use among the HD, DVD and CD, a coupling lens (also called the output angle conversion element; the same applies hereafter) CUL (preferably, the coupling lens is a plastic lens) having the optical surfaces both of which are the refractive surfaces without a diffractive structure thereon;

an objective optical element OBJ (preferably, the objective optical element is a plastic lens) capable of converging the incoming laser light flux onto the information recording plane of the optical disk;

a first dichroic prism DP1;

a polarized beam splitter (also called the separator: the same applies hereafter) PBS;

a half-mirror HM;

a λ/4 wave plate QWP; and a sensor lens SEN for adding astigmatism for the reflected light flux from the optical disk.

A diffraction structure is formed on the optical surface of the objective optical element OBJ wherein, when the light flux having a wavelength of λ1 has passed by, the amount of the second diffracted light is maximized; and when the light flux having a wavelengths of λ2 or λ3 has passed by, the amount of the first diffracted light is maximized. In addition to the aforementioned semiconductor laser LD1, the blue-violet SHG laser can also be used as the HD light source.

In the optical pickup apparatus PU1, when information is recorded and/or reproduced using the HD, the first semiconductor laser (also called the first light source; the same applies hereafter) LD1 is made to emit light. The divergent light flux having been emitted from the first semiconductor laser LD1 passes through the first dichroic prism DP1, the polarized beam splitter PBS and the half-mirror HM in that order. After that, it is converted into the finite convergent light flux having the convergent angle θ1 by the coupling lens CUL. This light flux passes through the λ/4 wave plate QWP and the diameter of the light flux is regulated by the stop STO (not illustrated). This light flux is made into a spot formed on the information recording plane by the objective optical element OBJ through the HD protective substrate. The objective optical element OBJ performs focusing and tracking using the biaxial actuator (not illustrated) arranged thereabout.

The reflected light flux having been modified into an information pit on the HD information recording plane again passes through the objective optical element OBJ and λ/4 wave plate QWP. After that, it further passes through the coupling lens CUL and half-mirror HM, and is reflected by the polarized beam splitter PBS. Astigmatism is added thereto by the sensor lens SEN and the light flux is converged onto the light receiving surface of the optical detector PD. Then information having been recorded on the HD can be read using the output signal of the optical detector PD.

In the optical pickup apparatus PU1, when the information is recorded and/or reproduced for the DVD, the second semiconductor laser (also called the second light source; the same applies hereafter) LD2 is activated. The divergent light flux emitted from the second semiconductor laser LD2 is reflected by the first dichroic prism DP1 and passes through the polarized beam splitter PBS and the half-mirror HM in that order. After that, the light flux is converted into the finite convergent light flux having the convergent angle θ2 (θ1≠θ2) by the coupling lens CUL. The light flux passes through the λ/4 wave plate QWP and its diameter is regulated by the stop STO (not illustrated) by the objective optical element OBJ. It is then turned into a spot formed on the information recording plane, through the DVD protective substrate by the objective optical element OBJ. The objective optical element OBJ performs focusing and tracking operations using the biaxial actuator (not illustrated) arranged in the periphery thereof.

The reflected light flux modulated by the information pit on the DVD information recording plane again passes through the objective optical element OBJ and λ/4 wave plate QWP. After that, the light flux passes through the coupling lens CUL and half-mirror HM, and is reflected by the polarized beam splitter PBS. After astigmatism is added by the sensor lens SEN, the light flux is converged onto the light receiving surface of the optical detector PD. Then the information recorded on the DVD can be read using the output signal of the optical detector PD.

In the optical pickup apparatus PU1, when information is recorded and/or reproduced for the CD, the third semiconductor laser (also called the third light source; the same applies hereafter) LD3 is made to emit light. The divergent light flux emitted from the third semiconductor laser LD3 is reflected by the half-mirror HM, and is converted into the finite divergent light flux with an divergence angle of θ3 by the coupling lens CUL. The light flux passes through the λ/4 wave plate QWP and the diameter of the light flux is regulated by the stop STO (not illustrated). This light flux is turned into a spot formed on the information recording plane through the CD protective substrate by the objective optical element OBJ. The objective optical element OBJ performs focusing and tracking operation using the biaxial actuator (not illustrated) arranged in the periphery thereof.

The reflected light flux modulated by the information pit on the CD information recording plane again passes through the objective optical element OBJ and λ/4 wave plate QWP. After that, this light flux passes through the coupling lens CUL and half-mirror HM and is reflected by the polarized beam splitter PBS. Astigmatism is added by the sensor lens SEN, and the light flux is converged onto the light receiving surface of the optical detector PD. Then the information recorded on the CD using the output signal of the optical detector PD.

Figure 2:
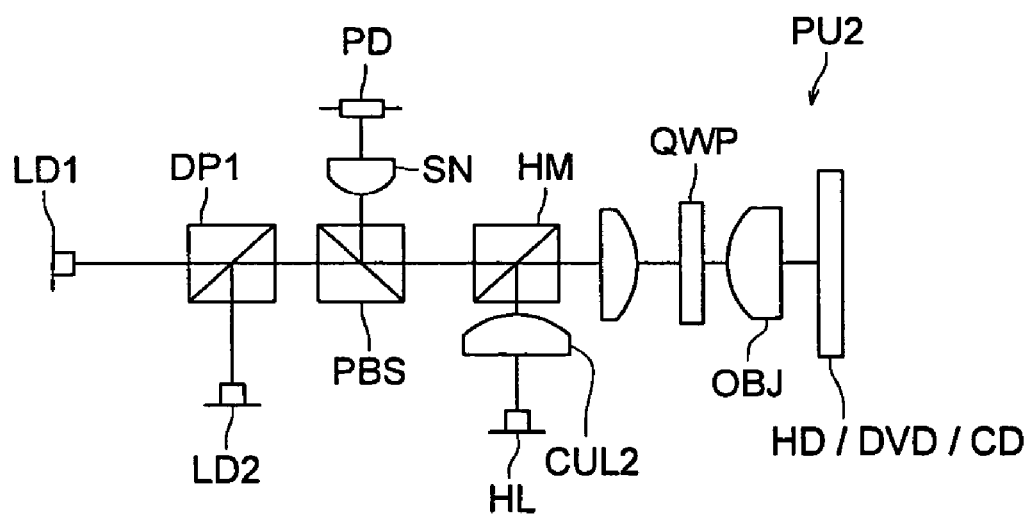
FIG. 2 is a schematic diagram showing the structure of the optical pickup apparatus PU2 as the present embodiment capable of recording and/or reproduction of the information for the HD, DVD and CD as different optical information recording media (also called the optical disks)

FIG. 2 is a schematic diagram showing the structure of the optical pickup apparatus PU2 as the present embodiment capable of recording and/or reproduction of the information for the HD, DVD and CD as different optical information recording media (also called the optical disks). This optical pickup apparatus PU2 can be mounted on the optical information recording and/or reproducing apparatus.

The optical pickup apparatus PU2 includes:

a first semiconductor laser LD1 actuated at the time of information recording and/or reproduction for the HD to emit the blue-violet laser light flux (first light flux) having a wavelength of λ1=407 nm;

a second semiconductor laser LD2 actuated at the time of information recording and/or reproduction for the DVD to emit the red laser light flux (second light flux) having a wavelength of λ2=655 nm;

a holo-laser HL made up of a third semiconductor laser actuated at the time of information recording and/or reproduction for the CD to emit the infrared laser light flux (third light flux) having a wavelength of λ3=785 nm, and an optical detector for CD integrally formed into one piece;

an optical detector PD for common use between the HD and DVD;

a first coupling lens CUL1 having the optical surface whose both optical surfaces are the refraction surfaces without a diffractive structure thereon;

a second coupling lens CUL2 only for the CD;

an objective optical element OBJ capable of converging the incoming laser light flux onto the information recording plane of the optical disk;

a first dichroic prism DP1;

a polarized beam splitter PBS;

a second dichroic prism DP2;

a λ/4 wave plate QWP; and a sensor lens SEN for adding astigmatism for the reflected light flux of the optical disk.

A diffractive structure is formed on the optical surface of the objective optical element OBJ wherein, when the light flux having a wavelength of λ1 has passed by, the amount of the second diffracted light is maximized; and when the light flux having a wavelengths of λ2 or λ3 has passed by, the amount of the first diffracted light is maximized. In addition to the aforementioned semiconductor laser LD1, the blue-violet SHG laser can also be used as the HD light source.

In the optical pickup apparatus PU2, when information is recorded and/or reproduced for the HD, the first semiconductor laser LD1 is made to emit light. The divergent light flux emitted from the first semiconductor laser LD1 passes through the first dichroic prism DP1, polarized beam splitter PBS and second dichroic prism DP2 in that order. After that, the light flux is converted into the finite convergent light flux having a convergent angle of θ1 by the first coupling lens CUL1. Then the light flux passes through the λ/4 wave plate QWP and the diameter thereof is regulated by the stop STO (not illustrated). The light flux is then turned into the spot formed on the information recording plane by the objective optical element OBJ through the HD protective substrate. The objective optical element OBJ performs focusing and tracking operation using the biaxial actuator (not illustrated) arranged in the periphery thereof.

The reflected light flux modulated by the information pit on the HD information recording plane again passes through the objective optical element OBJ and λ/4 wave plate QWP. After that, this light flux passes through the first coupling lens CUL1 and second dichroic prism DP2 and is reflected by the polarized beam splitter PBS. Astigmatism is added by the sensor lens SEN, and the light flux is converged onto the light receiving surface of the optical detector PD. Then the information recorded on the HD using the output signal of the optical detector PD.

In the optical pickup apparatus PU2, when information is recorded and/or reproduced for the DVD, the second semiconductor laser LD2 is made to emit light. The divergent light flux emitted from the second semiconductor laser LD2 is reflected by the first dichroic prism DP1, and passes through the polarized beam splitter PBS and second dichroic prism DP2 in that order. After that, the light flux is converted into the finite convergent light flux having a convergent angle of $\theta 2$ ($\theta 1 \neq \theta 2$) by the first coupling lens CUL1. Then the light flux passes through the $\lambda/4$ wave plate QWP and the diameter thereof is regulated by the stop STO (not illustrated). The light flux is then turned into the spot formed on the information recording plane by the objective optical element OBJ through the DVD protective substrate. The objective optical element OBJ performs focusing and tracking operation using the biaxial actuator (not illustrated) arranged in the periphery thereof.

The reflected light flux modulated by the information pit on the DVD information recording plane again passes through the objective optical element OBJ and $\lambda/4$ wave plate QWP. After that, this light flux passes through the first coupling lens CUL1 and second dichroic prism DP2 and is reflected by the polarized beam splitter PBS. Astigmatism is added by the sensor lens SEN, and the light flux is converged onto the light receiving surface of the optical detector PD. Then the information recorded on the DVD using the output signal of the optical detector PD.

In the optical pickup apparatus PU2, when information is recorded and/or reproduced for the CD, the third semiconductor laser of the holo-laser HL is made to emit light. The divergent light flux emitted from the third semiconductor laser passes through the second coupling lens CUL2 and is reflected by the second dichroic prism DP2. After that, the light flux is converted into the finite divergent light flux having a divergent angle of $\theta 3$ by the first coupling lens CUL1. Then the light flux passes through the $\lambda/4$ wave plate QWP and the diameter thereof is regulated by the stop STO (not illustrated). The light flux is then turned into the spot formed on the information recording plane by the objective optical element OBJ through the CD protective substrate. The objective optical element OBJ performs focusing and tracking operation using the biaxial actuator (not illustrated) arranged in the periphery thereof.

The reflected light flux modulated by the information pit on the CD information recording plane again passes through the objective optical element OBJ and $\lambda/4$ wave plate QWP. After that, this light flux passes through the first coupling lens CUL1 and is reflected by the second dichroic prism DP2. Then the light flux is converged onto the light receiving surface of the optical detector of the holo-laser HL through the second coupling lens CUL2. Thus, the information recorded on the CD using the output signal of the optical detector.

Figure 3:
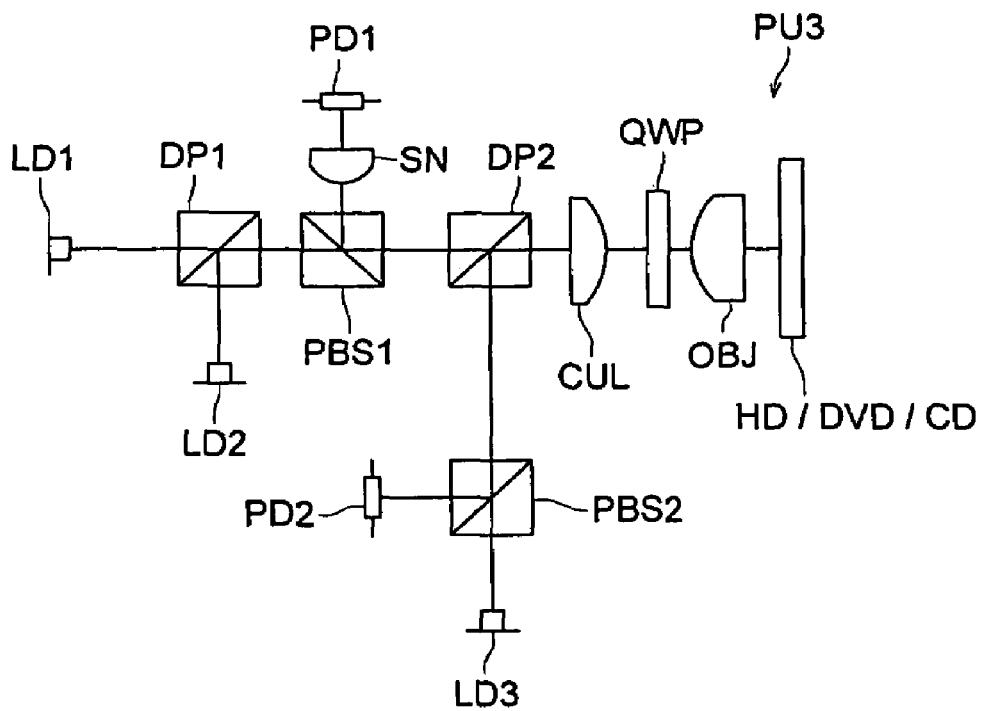
FIG. 3 is a schematic diagram showing the structure of the optical pickup apparatus PU3 as the present embodiment capable of recording and/or reproduction of the information for the HD, DVD and CD as different optical information recording media (also called the optical disks)

FIG. 3 is a schematic diagram showing the structure of the optical pickup apparatus PU3 as the present embodiment capable of recording and/or reproduction of the information for the HD, DVD and CD as different optical information recording media (also called the optical disks). This optical pickup apparatus PU3 can be mounted on the optical information recording and/or reproducing apparatus.

The optical pickup apparatus PU3 includes:
a first semiconductor laser LD1 actuated at the time of information recording and/or reproduction for the HD to emit the blue-violet laser light flux (first light flux) having a wavelength of $\lambda 1=407$ nm;
a second semiconductor laser LD2 actuated at the time of information recording and/or reproduction for the DVD to emit the red laser light flux (second light flux) having a wavelength of $\lambda 2=655$ nm;
a third semiconductor laser LD3 actuated at the time of information recording and/or reproduction for the CD to emit the red laser light flux (second light flux) having a wavelength of $\lambda=785$ nm;
an optical detector PD1 for common use between the HD and DVD;
a second optical detector PD2 only for the CD;
a coupling lens CUL whose both optical surfaces are the refractive surfaces without a diffractive structure thereon;
an objective optical element OBJ capable of converging the incoming laser light flux onto the information recording plane of the optical disk;
a first dichroic prism DP1;
a first polarized beam splitter PBS1;
a second dichroic prism DP2;
a second polarized beam splitter PBS2;
a $\lambda/4$ wave plate QWP; and
a sensor lens SEN for adding astigmatism for the reflected light flux of the optical disk.

A diffraction structure is formed on the optical surface of the objective optical element OBJ wherein, when the light flux having a wavelength of $\lambda 1$ has passed by, the amount of the second diffracted light is maximized; and when the light flux having a wavelengths of $\lambda 2$ and $\lambda 3$ has passed by, the amount of the first diffracted light is maximized. In addition to the semiconductor laser LD1, the blue-violet SHG laser can also be used as the HD light source.

In the optical pickup apparatus PU3, when information is recorded and/or reproduced for the HD, the first semiconductor laser LD1 is made to emit light. The divergent light flux emitted from the first semiconducting laser LD1 passes through the first dichroic prism DP1, the first polarized beam splitter PBS1 and second dichroic prism DP2 in that order. After that, the light flux is converted into the finite convergent light flux having a convergent angle of $\theta 1$ by the coupling lens CUL. Then the light flux passes through the $\lambda/4$ wave plate QWP and the diameter thereof is regulated by the stop STO (not illustrated). The light flux is then turned into the spot formed on the information recording plane by the objective optical element OBJ through the HD protective substrate. The objective optical element OBJ performs focusing and tracking operation using the biaxial actuator (not illustrated) arranged in the periphery thereof.

The reflected light flux modulated by the information pit on the HD information recording plane again passes through the objective optical element OBJ and $\lambda/4$ wave plate QWP. After that, this light flux passes through the coupling lens CUL and second dichroic prism DP2 and is reflected by the first polarized beam splitter PBS1. Astigmatism is added by the sensor lens SEN, and the light flux is converged onto the light receiving surface of the first optical detector PD1. Then the information recorded on the HD using the output signal of the first optical detector PD1.

In the optical pickup apparatus PU3, when information is recorded and/or reproduced for the DVD, the second semiconductor laser LD2 is made to emit light. The divergent light flux emitted from the second semiconductor laser LD2 is reflected by the first dichroic prism DP1. Then the light flux passes through the first polarized beam splitter PBS1 and second dichroic prism DP2. After that, the light flux is converted into the finite convergent light flux having a convergent angle of θ2 (θ1≠θ2) by the coupling lens CUL. Then the light flux passes through the λ/4 wave plate QWP and the diameter thereof is regulated by the stop STO (not illustrated). The light flux is then turned into the spot formed on the information recording plane by the objective optical element OBJ through the DVD protective substrate. The objective optical element OBJ performs focusing and tracking operation using the biaxial actuator (not illustrated) arranged in the periphery thereof.

The reflected light flux modulated by the information pit on the DVD information recording plane again passes through the objective optical element OBJ and λ4 wave plate QWP. After that, this light flux passes through the coupling lens CUL and second dichroic DP2, and is reflected by the first polarized beam splitter PBS1. Astigmatism is added thereto by the sensor lens SEN and the light flux is converged onto the light receiving surface of the first optical detector PD1. Then information having been recorded on the DVD can be read using the output signal of the first optical detector PD1.

In the optical pickup apparatus PU3, when information is recorded and/or reproduced for the CD, the third semiconductor laser LD3 is made to emit light. The divergent light flux emitted from the third semiconductor laser LD3 passes through the second polarized beam splitter PBS2 and is reflected by the second dichroic prism DP2. After that, the light flux is converted into the finite divergent light flux having a divergent angle of θ3 by the coupling lens CUL. Then the light flux passes through the λ/4 wave plate QWP and the diameter thereof is regulated by the stop STO (not illustrated). The light flux is then turned into the spot formed on the information recording plane by the objective optical element OBJ through the DVD protective substrate. The objective optical element OBJ performs focusing and tracking operation using the biaxial actuator (not illustrated) arranged in the periphery thereof.

The reflected light flux modulated by the information pit on the CD information recording plane again passes through the objective optical element OBJ and λ/4 wave plate QWP. After that, this light flux passes through the coupling lens CUL and is reflected by the second dichroic prism DP2. After it has been further reflected by the second polarized beam splitter PBS2, the light flux is converged onto the light receiving surface of the second optical detector PD2. Then information having been recorded on the CD can be read using the output signal of the second optical detector PD2.

Figure 4:
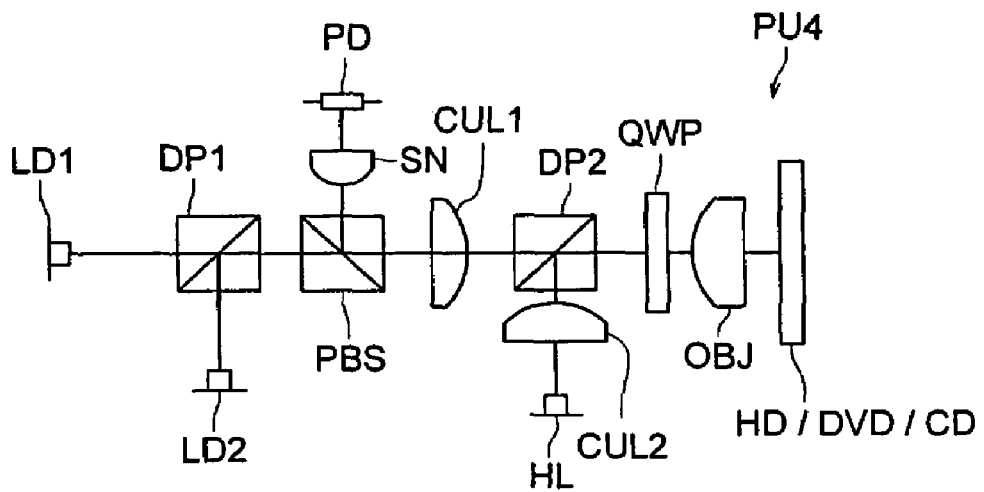
FIG. 4 is a schematic diagram showing the structure of the optical pickup apparatus PU4 as the present embodiment capable of recording and/or reproduction of the information for the HD, DVD and CD as different optical information recording media (also called the optical disks)

FIG. 4 is a schematic diagram showing the structure of the optical pickup apparatus PU4 as the present embodiment capable of recording and/or reproduction of the information for the HD, DVD and CD as different optical information recording media (also called the optical disks). This optical pickup apparatus PU4 can be mounted on the optical information recording and/or reproducing apparatus.

The optical pickup apparatus PU4 includes:

a first semiconductor laser LD1 actuated at the time of information recording and/or reproduction for the HD to emit the blue-violet laser light flux (first light flux) having a wavelength of λ1=407 nm;

a second semiconductor laser LD2 actuated at the time of information recording and/or reproduction for the DVD to emit the red laser light flux (second light flux) having a wavelength of λ2=655 nm;

a holo-laser HL made up of a third semiconductor laser actuated at the time of information recording and/or reproduction for the CD to emit the infrared laser light flux (third light flux) having a wavelength of λ3=785 nm, and an optical detector for CD integrally formed into one piece;

an optical detector PD for common use between the HD and DVD;

a first coupling lens CUL1 for common use between the HD and DVD whose both optical surfaces are the refractive surfaces without a diffractive structure thereon;

a second coupling lens CUL2 only for the CD;

an objective optical element OBJ capable of converging the incoming laser light flux onto the information recording plane of the optical disk;

a first dichroic prism DP1;

a polarized beam splitter PBS;

a second dichroic prism DP2;

a λ/4 wave plate QWP; and a sensor lens SEN for adding astigmatism for the reflected light flux of the optical disk.

A diffractive structure is formed on the optical surface of the objective optical element OBJ wherein, when the light flux having a wavelength of λ1 has passed by, the amount of the second diffracted light is maximized; and when the light flux having a wavelengths of λ2 or λ3 has passed by, the amount of the first diffracted light is maximized. In addition to the semiconductor laser LD1, the blue-violet SHG laser can also be used as the HD light source.

In the optical pickup apparatus PU4, when information is recorded and/or reproduced for the HD, the first semiconductor laser LD1 is made to emit light. The divergent light flux emitted from the first semiconductor laser LD1 passes through the first dichroic prism DP1 and polarized beam splitter PBS. After that, the light flux is converted into the finite convergent light flux having a convergent angle of θ1 by the first coupling lens CUL1. Then the light flux passes through the second dichroic prism DP2 and the λ/4 wave plate QWP. The diameter thereof is regulated by the stop STO (not illustrated). The light flux is then turned into the spot formed on the information recording plane by the objective optical element OBJ through the HD protective substrate. The objective optical element OBJ performs focusing and tracking operation using the biaxial actuator (not illustrated) arranged in the periphery thereof.

The reflected light flux modulated by the information pit on the HD information recording plane again passes through the objective optical element OBJ and λ/4 wave plate QWP. After that, the light flux passes through the second dichroic prism DP2 and first coupling lens CUL1, and is reflected by the polarized beam splitter PBS. After astigmatism is added by the sensor lens SEN, the light flux is converged onto the light receiving surface of the optical detector PD. Then the information recorded on the HD can be read using the output signal of the optical detector PD.

In the optical pickup apparatus PU4, when information is recorded and/or reproduced for the DVD, the second semiconductor laser LD2 is made to emit light. The divergent light flux emitted from the second semiconductor laser LD2 is reflected by the first dichroic prism DP1 and passes through the polarized beam splitter PBS. After that, the light flux is converted into the finite convergent light flux having a convergent angle of θ2 (θ1≠θ2) by the first coupling lens CUL1. Then the light flux passes through the second dichroic prism DP2 and the λ/4 wave plate QWP. The diameter thereof is regulated by the stop STO (not illustrated). The light flux is then turned into the spot formed on the information recording plane by the objective optical element OBJ through the DVD protective substrate. The objective optical element OBJ performs focusing and tracking operation using the biaxial actuator (not illustrated) arranged in the periphery thereof.

The reflected light flux modulated by the information pit on the DVD information recording plane again passes through the objective optical element OBJ and λ/4 wave plate QWP. After that, the light flux passes through the second dichroic prism DP2 and first coupling lens CUL1, and is reflected by the polarized beam splitter PBS. After astigmatism is added by the sensor lens SEN, the light flux is converged onto the light receiving surface of the optical detector PD. Then the information recorded on the DVD can be read using the output signal of the optical detector PD.

In the optical pickup apparatus PU4, when information is recorded and/or reproduced for the CD, the third semiconductor laser of the holo-laser HL is made to emit light. The divergent light flux emitted from the third semiconductor laser is converted into the finite divergent light flux having a divergent angle of θ3 by the second coupling lens CUL2. Then the light flux is reflected by the second dichroic prism DP2 and passes through the λ/4 wave plate QWP. The diameter thereof is regulated by the stop STO (not illustrated). The light flux as divergent light flux enters the objective optical element OBJ and is turned into the spot formed on the information recording plane by the objective optical element OBJ through the CD protective substrate. The objective optical element OBJ performs focusing and tracking operation using the biaxial actuator (not illustrated) arranged in the periphery thereof.

The reflected light flux modulated by the information pit on the CD information recording plane again passes through the objective optical element OBJ and λ/4 wave plate QWP. After that, the light flux is reflected by the second dichroic prism DP2. Then the light flux is converged onto the light receiving surface of the optical detector of the holo-laser HL through the second coupling lens CUL2. Then the information recorded on the CD can be read using the output signal of the optical detector.

Figure 5:
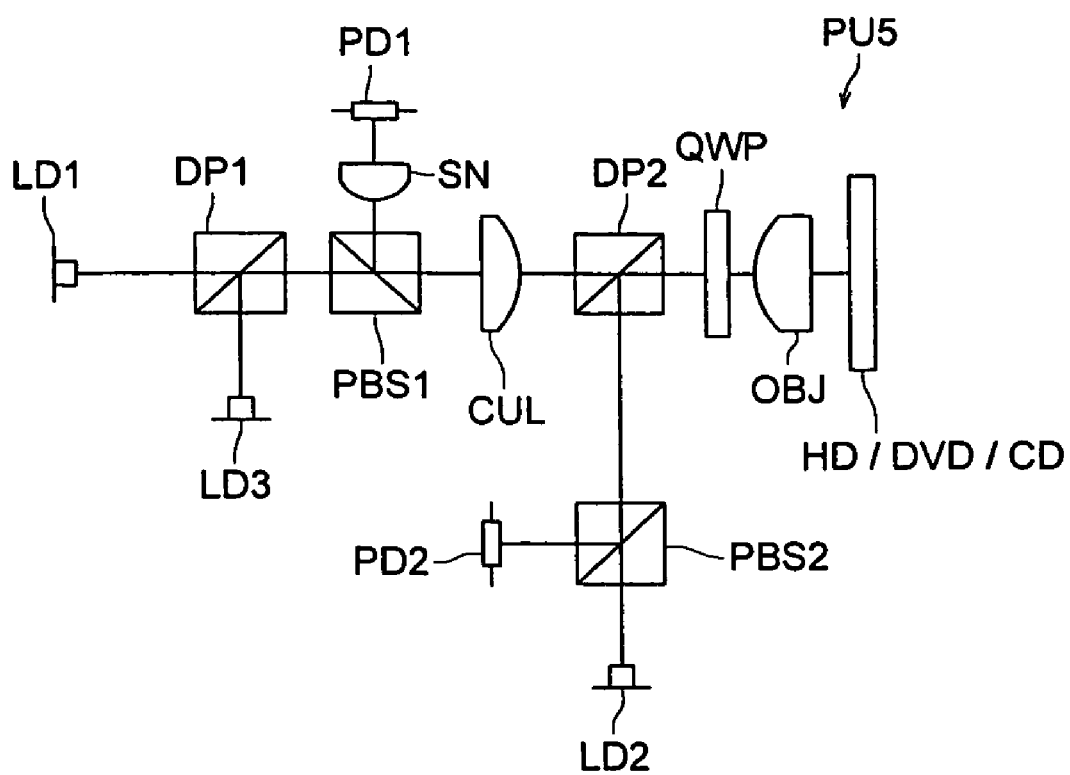
FIG. 5 is a schematic diagram showing the structure of the optical pickup apparatus PU5 as the present embodiment capable of recording and/or reproduction of the information for the HD, DVD and CD as different optical information recording media (also called the optical disks)

FIG. 5 is a schematic diagram showing the structure of the optical pickup apparatus PU5 as the present embodiment capable of recording and/or reproduction of the information for the HD, DVD and CD as different optical information recording media (also called the optical disks). This optical pickup apparatus PU5 can be mounted on the optical information recording and/or reproducing apparatus.

The optical pickup apparatus PU5 includes:

a first semiconductor laser LD1 actuated at the time of information recording and/or reproduction for the HD to emit the blue-violet laser light flux (first light flux) having a wavelength of λ1=407 nm;

a second semiconductor laser LD2 actuated at the time of information recording and/or reproduction for the DVD to emit the red laser light flux (second light flux) having a wavelength of λ2=655 nm;

a third semiconductor laser LD3 actuated at the time of information recording and/or reproduction for the CD to emit the red laser light flux (third light flux) having a wavelength of λ3=785 nm;

an optical detector PD1 for common use between the HD and CD;

a second optical detector PD2 only for the DVD;

a coupling lens CUL whose both optical surfaces are the refractive surfaces without a diffractive structure thereon;

an objective optical element OBJ capable of converging the incoming laser light flux onto the information recording plane of the optical disk;

a first dichroic prism DP1;

a first polarized beam splitter PBS1;

a second dichroic prism DP2;

a second polarized beam splitter PBS2;

a λ/4 wave plate QWP; and a sensor lens SEN for adding astigmatism for the reflected light flux of the optical disk.

A diffraction structure is formed on the optical surface of the objective optical element OBJ wherein, when the light flux having a wavelength of λ1 has passed by, the amount of the second diffracted light is maximized; and when the light flux having a wavelengths of λ2 and λ3 has passed by, the amount of the first diffracted light is maximized. In addition to the semiconductor laser LD1, the blue-violet SHG laser can also be used as the HD light source.

In the optical pickup apparatus PU5, when information is recorded and/or reproduced for the HD, the first semiconductor laser LD1 is made to emit light. The divergent light flux emitted from the first semiconductor laser LD1 passes through the first dichroic prism DP1 and the first polarized beam splitter PBS1. After that, the light flux is converted into the finite convergent light flux having a convergent angle of θ1 by the coupling lens CUL. Then the light flux passes through the second dichroic prism DP2 and the λ/4 wave plate QWP. The diameter thereof is regulated by the stop STO (not illustrated). The light flux is then turned into the spot formed on the information recording plane by the objective optical element OBJ through the HD protective substrate. The objective optical element OBJ performs focusing and tracking operation using the biaxial actuator (not illustrated) arranged in the periphery thereof.

The reflected light flux modulated by the information pit on the HD information recording plane again passes through the objective optical element OBJ and λ/4 wave plate QWP. After that, the light flux passes through the second dichroic prism DP2 and coupling lens CUL, and is reflected by the first polarized beam splitter PBS1. After astigmatism is added by the sensor lens SEN, the light flux is converged onto the light receiving surface of the first optical detector PD1. Then the information recorded on the HD can be read using the output signal of the first optical detector PD1.

In the optical pickup apparatus PU5, when information is recorded and/or reproduced for the DVD, the second semiconductor laser LD2 is made to emit light. The divergent light flux emitted from the second semiconductor laser LD2 passes through the second polarized beam splitter PBS2 and is reflected by the second dichroic prism DP2. Then the light flux passes through the λ/4 wave plate QWP, and the diameter thereof is regulated by the stop STO (not illustrated). The light flux enters the objective optical element as the divergent light flux and is then turned into the spot formed on the information recording plane by the objective optical element OBJ through the DVD protective substrate. The objective optical element OBJ performs focusing and tracking operation using the biaxial actuator (not illustrated) arranged in the periphery thereof.

The reflected light flux modulated by the information pit on the DVD information recording plane again passes through the objective optical element OBJ and λ/4 wave plate QWP. After that, the light flux is reflected by the second dichroic prism DP2 and again by the second polarized beam splitter PBS2. Then the light flux is converged onto the light receiving surface of the second optical detector PD2. Then the information recorded on the DVD can be read using the output signal of the second optical detector PD2.

In the optical pickup apparatus PU5, when information is recorded and/or reproduced for the CD, the third semiconductor laser LD3 is made to emit light. The divergent light flux emitted from the third semiconductor laser LD3 is reflected by the first dichroic prism DP1. After having passes through the first polarized beam splitter PBS1, the light flux is converted into the finite convergent light flux having a convergent angle of θ3 (θ1≠θ3) by the coupling lens CUL. Then the light flux passes through the second dichroic prism DP2 and λ/4 wave plate QWP. The diameter thereof is regulated by the stop STO (not illustrated). The light flux is turned into the spot formed on the information recording plane by the objective optical element OBJ through the CD protective substrate. The objective optical element OBJ performs focusing and tracking operation using the biaxial actuator (not illustrated) arranged in the periphery thereof.

The reflected light flux modulated by the information pit on the CD information recording plane again passes through the objective optical element OBJ and λ/4 wave plate QWP. After that, the light flux passes through the second dichroic prism DP2 and coupling lens CUL, and is reflected by the first polarized beam splitter PBS1. After astigmatism is added by the sensor lens SEN, the light flux is converged onto the light receiving surface of the first optical detector PD1. Then the information recorded on the CD can be read using the output signal of the first optical detector PD1.

Figure 9:
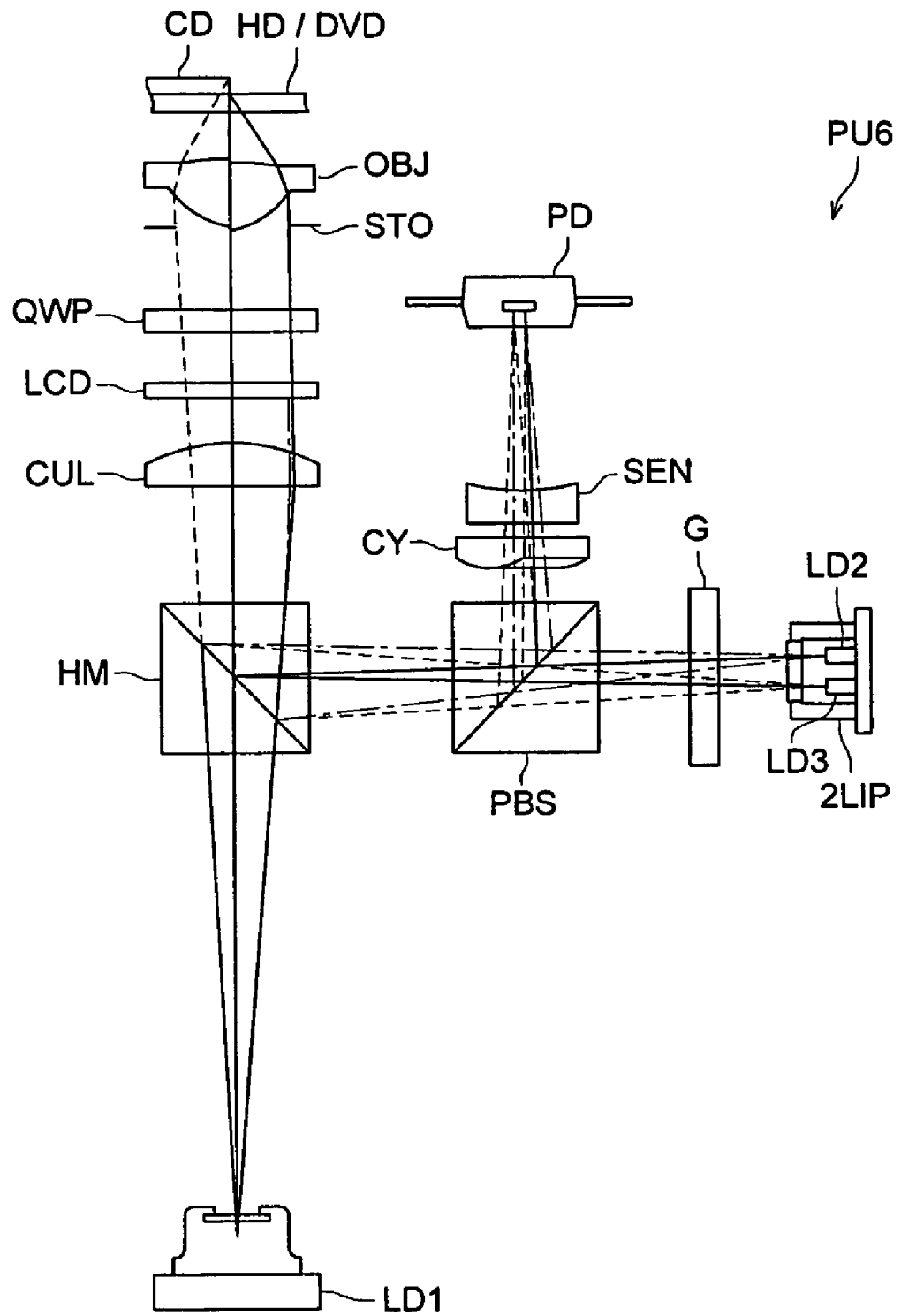
FIG. 9 is a schematic diagram showing the structure of the optical pickup apparatus PU6 as the present embodiment capable of recording and/or reproduction of the information for the HD, DVD and CD as different optical information recording media (also called the optical disks)

FIG. 9 is a schematic diagram showing the structure of the optical pickup apparatus PU6 as the present embodiment capable of recording and/or reproduction of the information for the HD, DVD and CD as different optical information recording media (also called the optical disks). This optical pickup apparatus PU6 can be mounted on the optical information recording and/or reproducing apparatus.

The optical pickup apparatus PU6 includes:

a first semiconductor laser LD1 actuated at the time of information recording and/or reproduction for the HD to emit the blue-violet laser light flux (first light flux) having a wavelength of $\lambda 1$=406 nm;

a two-laser one-package 2L1P, comprising:

a second semiconductor laser LD2 actuated at the time of information recording and/or reproduction for the DVD to emit the red laser light flux (second light flux) having a wavelength of $\lambda 2$=655 nm; and a third semiconductor laser LD3 actuated at the time of information recording and/or reproduction for the CD to emit the red laser light flux (second light flux) having a wavelength of $\lambda 3$=785 nm;

an optical detector PD for common use among the HD, DVD and CD;

a coupling lens (also called the output angle conversion element; the same applies hereafter) CUL whose both optical surfaces are the refractive surfaces without a diffractive structure thereon;

an objective optical element OBJ capable of converging the incoming laser light flux onto the information recording plane of the optical disk;

a polarized beam splitter (also called the separator; the same applies hereafter) (PBS);

a half-mirror HM;

a λ/4 wave plate QWP; and a cylindrical lens CY for adding astigmatism to the reflected light flux of the optical disk;

a sensor lens SEN;

a liquid crystal element LCD; and a diffraction grating G as an optical device for separating the light flux having been emitted from the light source, into a recording and/or reproduction main beam and a and tracking error signal detection sub-beam.

A diffractive structure is formed on the optical surface of the objective optical element OBJ wherein, when the light flux having a wavelength of $\lambda 1$ has passed by, the amount of the third diffracted light is maximized; and when the light flux having wavelengths of $\lambda 2$ or $\lambda 3$ has passed by, the amount of the second diffracted light is maximized. In addition to the semiconductor laser LD1, the blue-violet SHG laser can also be used as the HD light source.

In the optical pickup apparatus PU6, when information is recorded and/or reproduced for the HD, the first semiconductor laser LD1 is made to emit light. The divergent light flux emitted from the first semiconductor laser LD1 passes through the half-mirror HM indicated by a solid line. After that, the light flux is converted into the finite convergent light flux having a convergent angle of θ1 or infinite collimated light flux by the coupling lens CUL. Then the light flux passes through the liquid crystal element LCD, and is provided with a predetermined phase status (including the case where phase status is not converted). After the light flux has passed through the λ/4 wave plate QWP, the diameter thereof is regulated by the stop STO. The light flux is then turned into the spot formed on the information recording plane by the objective optical element OBJ through the HD protective substrate. The objective optical element OBJ performs focusing and tracking operation using the biaxial actuator (not illustrated) arranged in the periphery thereof.

The reflected light flux modulated by the information pit on the HD information recording plane again passes through the objective optical element OBJ, λ/4 wave plate QWP and liquid crystal element LCD. After that, the light flux passes through the coupling lens CUL, and is reflected by the half mirror HM and polarized beam splitter PBS. The light flux passes through the cylindrical lens CY and sensor lens SEN, and is provided with astigmatism. Then the light flux is converged onto the light receiving surface of the optical detector PD. Then the information recorded on the HD can be read using the output signal of the optical detector PD.

In the optical pickup apparatus PU6, when information is recorded and/or reproduced for the DVD, the second semiconductor laser LD2 of the two-laser one-package 2L1P is made to emit light. The divergent light flux emitted from the second semiconductor laser LD2 passes through the diffraction grating G as indicated by the one-dot chain line. After that, the light flux passes through the polarized beam splitter PBS and is reflected by the half-mirror HM. Then the light flux is converted into the finite divergent light flux having a divergent angle of θ2 (θ1≠θ2) or infinite. collimated light flux by the coupling lens CUL. Then the light flux passes through the liquid crystal element LCD, and is provided with a predetermined phase status. After the light flux has passed through the λ/4 wave plate QWP, the diameter thereof is regulated by the stop STO. The light flux is then turned into the spot formed on the information recording plane by the objective optical element OBJ through the DVD protective substrate. The objective optical element OBJ performs focusing and tracking operation using the biaxial actuator (not illustrated) arranged in the periphery thereof.

The reflected light flux modulated by the information pit on the DVD information recording plane again passes through the objective optical element OBJ, λ/4 wave plate QWP and liquid crystal element LCD. After that, the light flux passes through the coupling lens CUL, and is reflected by the half mirror HM and polarized beam splitter PBS. The light flux passes through the cylindrical lens CY and sensor lens SEN, and is provided with astigmatism. Then the light flux is converged onto the light receiving surface of the optical detector PD. Then the information recorded on the DVD can be read using the output signal of the optical detector PD.

In the optical pickup apparatus PU6, when information is recorded and/or reproduced for the CD, the third semiconductor laser LD3 of the two-laser one-package 2L1P is made to emit light. The divergent light flux emitted from the third semiconductor laser LD3 passes through the diffraction grating G as indicated by the dotted line. After that, the light flux passes through the polarized beam splitter PBS and is reflected by the half-mirror HM. Then the light flux is converted into the finite convergent light flux having a convergent angle of θ3, finite divergent light flux having a divergent angle of θ3 or infinite collimated light flux by the coupling lens CUL. Then the light flux passes through the liquid crystal element LCD, and is provided with a predetermined phase status. After the light flux has passed through the λ/4 wave plate QWP, the diameter thereof is regulated by the stop STO. The light flux is then turned into the spot formed on the information recording plane by the objective optical element OBJ through the CD protective substrate. The objective optical element OBJ performs focusing and tracking operation using the biaxial actuator (not illustrated) arranged in the periphery thereof.

The reflected light flux modulated by the information pit on the CD information recording plane again passes through the objective optical element OBJ, $\lambda/4$ wave plate QWP and liquid crystal element LCD. After that, the light flux passes through the coupling lens CUL, and is reflected by the half mirror HM and polarized beam splitter PBS. The light flux passes through the cylindrical lens CY and sensor lens SEN, and is provided with astigmatism. Then the light flux is converged onto the light receiving surface of the optical detector PD. Then the information recorded on the CD can be read using the output signal of the optical detector PD.

If there are a plurality of HD information recording planes, the liquid crystal element LCD corrects the spherical aberration occurring between the convergent spot of a certain information recording plane and that on another information recording plane, whereby information is recorded and/or reproduced for a plurality of substrates. The liquid crystal element LCD gives a non-rotational-symmetric phase difference to the light flux that passes by, whereby the comatic aberration and astigmatism are corrected.

Figure 6:
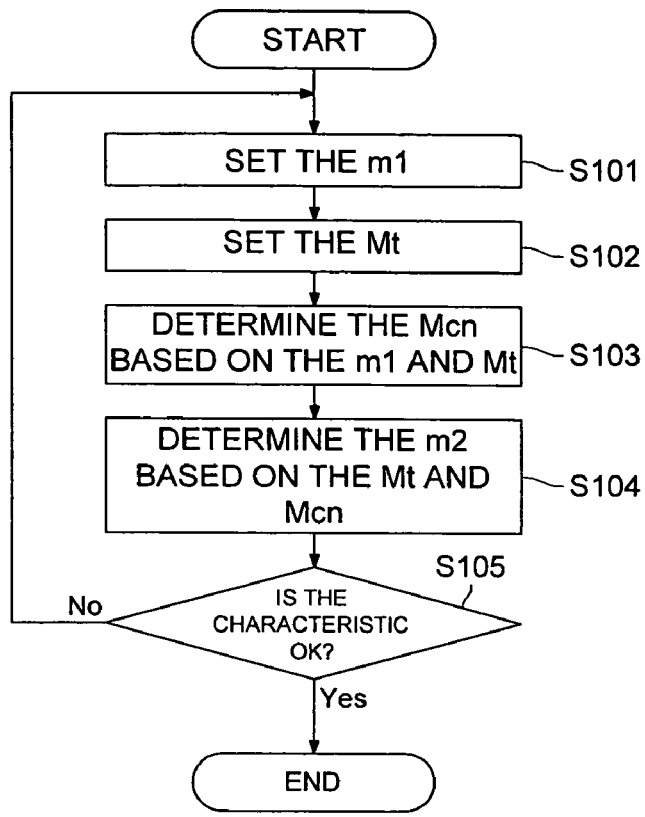
FIG. 6 is a flow chart representing an example of the method of designing the optical system for optical pickup apparatus.
Figure 7:
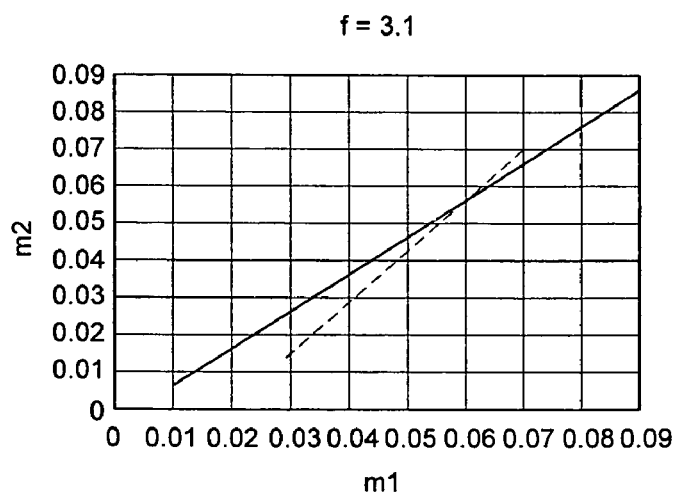
FIG. 7 is a diagram formed by plotting the magnifications m1 and m2 when a coupling lens is arranged on the light source side of the objective optical element having a focal distance of 3.1 mm and the magnification Mt of the optical system for optical pickup apparatus as a whole is assumed as 8.
Figure 8:
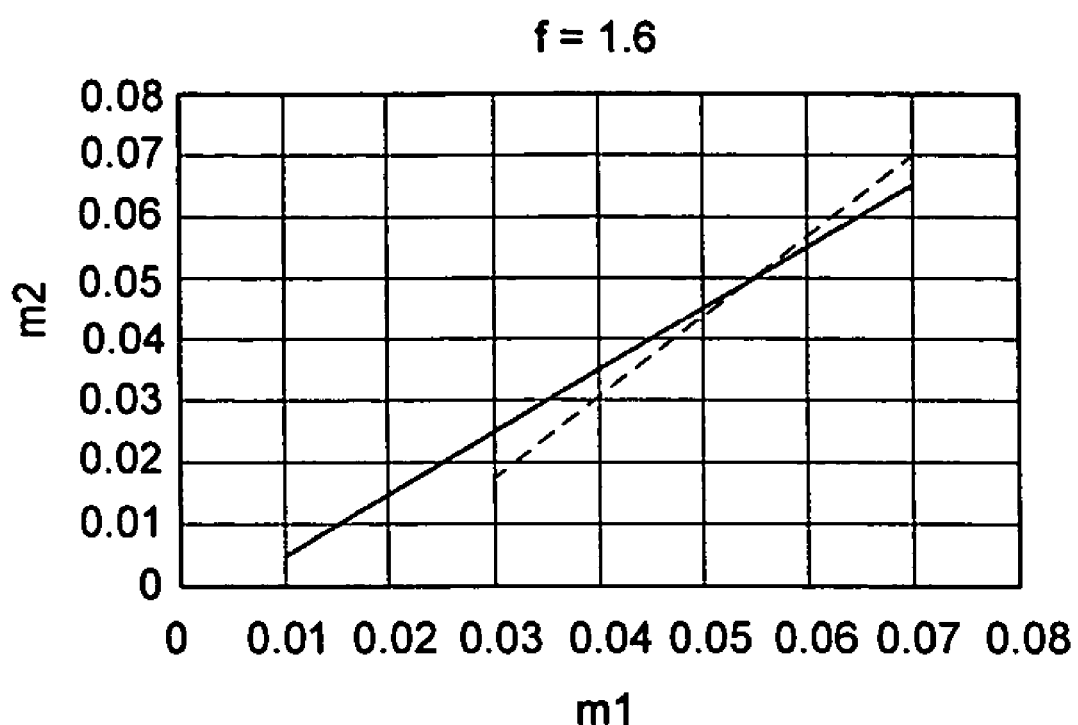
FIG. 8 is a diagram formed by plotting the magnifications m1 and m2 when a coupling lens is arranged on the light source side of the objective optical element having a focal distance of 1.6 mm and the magnification Mt of the optical system for optical pickup apparatus as a whole is assumed as 8.

The following describes the method for designing the optical system for optical pickup apparatus (coupling lens and objective optical element in this case) of the present embodiment: FIG. 6 is a flow chart representing an example of the method of designing the optical system for optical pickup apparatus shown in FIGS. 1 through 5. FIG. 7 is a diagram formed by plotting the magnifications m1 and m2 when a coupling lens is arranged on the light source side of the objective optical element having a focal distance of 3.1 mm and the magnification Mt of the optical system for optical pickup apparatus as a whole is assumed as 8. FIG. 8 is a diagram formed by plotting the magnifications m1 and m2 when a coupling lens is arranged on the light source side of the objective optical element having a focal distance of 1.6 mm and the magnification Mt of the optical system for optical pickup apparatus as a whole is assumed as 8.

In FIG. 6, the Step S101 sets the magnification m1 of the objective optical element during the use of the HD (or DVD). The ensuing Step S102 sets the magnification Mt of the optical system for optical pickup apparatus as a whole. The Mt is determined according to the specifications of the optical pickup apparatus. Based on the magnification m1 and Mt having been set, the Step S103 determines the magnification Mcn of the coupling lens whose optical surfaces are constituted by the refractive surfaces alone. Based on the magnification Mt and Mcn, the ensuing Step S104 determines the magnification m2 of the objective optical element during the use of the DVD (or HD).

In the Step S105, based on the magnifications m1, m2, Mt and Mcn, at least one of the four following characteristics (a) through (d) with respect to the optical system for the optical pickup apparatus is verified to determine if a predetermined standard has been met or not:

(a) Amount of change in wavefront aberration when the ambient temperature has risen by a predetermined level (b) Amount of comatic aberration having occurred when the objective optical element has tracked a predetermined distance (c) Working Distance between the objective optical element and HD (d) Amount of change in wavefront aberration when the wavelength of the light flux to be used has changed by predetermined amount By way of an example, the following verifies (a) the amount of change in wavefront aberration when the ambient temperature has risen by 30° C. (called the temperature characteristic): Assume that f=3.1, and, when the diffraction efficiency of the objective lens is maximized, the diffraction order is the second order for the light flux having a wavelength of 405 nm, the first order for the light flux having a wavelength of 650 nm, and the first order for the light flux having a wavelength of 780 nm. Based on the aforementioned assumption, the chart shown by the dotted line in FIG. 7 represents a combination of magnifications m1 and m2 when the ambient temperature has risen 30° C. and the wavefront aberration deterioration is 0.040 $\lambda$rms. When the ambient temperature has risen 30° C., the deterioration of wavefront aberration is preferably 0.040 $\lambda$rms or less. Thus, the m1 and m2 are preferably selected from the range below the dotted line chart. The chart shown by the solid line indicates the design values of the m1 and m2 in order to meet the magnification Mt=8 of the optical system for optical pickup apparatus as a whole. It can be seen, therefore, that, in order to ensure that the magnification Mt of the optical system for optical pickup apparatus as a whole is 8 without the coupling lens being provided with a diffraction structure and without any displacement in the direction of optical axis, it is necessary to select the magnification (i.e. m1=0.058 and m2=0.054) as an intersection indicated by the solid line and dotted line and the magnification located in the range wherein the solid line is positioned below the dotted line. Further, assume that f=1.6, and, when the diffraction efficiency of the objective lens is maximized, the diffraction is the second order for the light flux having a wavelength of 405 nm, the first order for the light flux having a wavelength of 650 nm, and the first order for the light flux having a wavelength of 780 nm. Based on the aforementioned assumption, the chart shown by the dotted line in FIG. 8 represents a combination of magnifications m1 and m2 when the ambient temperature has risen 30° C. and the wavefront aberration deteriorates 0.015 $\lambda$rms. When the ambient temperature has risen 30° C., the deterioration of wavefront aberration is preferably 0.015 $\lambda$rms or less. Thus, the m1 and m2 are preferably selected from the range below the dotted line chart. The chart shown by the solid line indicates the design values of the m1 and m2 in order to meet the magnification Mt=8 of the optical system for optical pickup apparatus as a whole. It can be seen, therefore, that, in order to ensure that the magnification Mt of the optical system for optical pickup apparatus as a whole is 8 without the coupling lens being provided with a diffraction structure and without any displacement in the direction of optical axis, it is necessary to select the magnification (i.e. m1=0.055 and m2=0.050) as an intersection indicated by the solid line and dotted line and the magnification located in the range wherein the solid line is positioned below the dotted line.

The requirements (b) and (d) are also verified in the aforementioned manner. If all requirements cannot be met, the system goes back to Step S101 of FIG. 6 and the magnification m1 is set again. In this manner, Steps S102 through S104 are repeated. If all requirements have been met, designing of the optical system for optical pickup apparatus terminates.

The designing method of the present embodiment is applicable to the optical pickup apparatus capable of recording and/or reproduction of information for different optical disks, and makes it possible to design an optical system for optical pickup apparatus without the coupling lens being provided with diffraction structure or displacement being made in the direction of optical axis. This method improve the light utilization rate as compared with the method of using a coupling lens provided with a diffraction structure. Further, the coupling lens is made of the refractive surface alone. This ensures easy production of a mold, reduces the molding time and increases production in a shorter time. As compared to the case of using the coupling lens capable of displacement in the direction of optical axis, this method ensures a simplified structure and reduced cost since there is no movable portion.

EXAMPLE

The following describes the example preferably applicable to the present embodiment. In this case, Examples 1 through 4 are applicable to any of the pickup apparatuses shown in FIGS. 1 through 3. Example 5 through 7 are applicable to the optical pickup apparatus shown in FIG. 9. In the following description (including the lens data in the Table), the power multiplier of 10 (e.g. $2.5 \times 10^{-3}$) will be expressed in terms of "E" (e.g. 2.5 E-3).

The optical surface of the objective optical system is formed on the axially symmetric aspherical surface around the optical axis, the aforementioned aspherical surface being specified by the mathematical expression obtained by substituting the coefficient indicated in the Table into the mathematical expression 1.

$$z = (y^2/R)/\left[1 + \sqrt{\{1 - (K+1)(y/R)^2\}}\right] + A_4 y^4 + A_6 y^6 + A_8 y^8 + A_{10} y^{10} + A_{12} y^{12} + A_{14} y^{14} + A_{16} y^{16} + A_{18} y^{18} + A_{20} y^{20}$$

[Mathematical expression 1]

where z represents an aspherical form (distance in the direction of optical axis from the plane surface in contact with the surface vertex of the aspherical form, y represents the distance from optical axis, R represents the curvature radius, K represents a Cornic coefficient, and $A_4$, $A_6$, $A_8$, $A_{10}$, $A_{12}$, $A_{14}$, $A_{16}$, $A_{18}$ and $A_{20}$ represent aspherical surface coefficients.

The difference in the optical path given to the light flux of each wavelength by the diffractive structure (phase structure) is specified by the mathematical expression obtained by substituting the coefficient indicated in the Table into the optical path difference function of the mathematical expression 2.

$$\phi = dor \times \lambda/\lambda_B \times (B_2 y^2 + B_4 y^4 + B_6 y^6 + B_8 y^8 + B_{10} y^{10})$$

[Mathematical Expression 2]

where $\phi$ denotes an optical path difference function, $\lambda$ shows the wavelength of the light flux entering the diffractive structure, $\lambda_B$ represents the blaze wavelength, dor indicates the order of the diffracted light used for recording and/or reproduction for the optical disk, y shows the distance from optical axis, and $B_2$, $B_4$, $B_6$, $B_8$ and $B_{10}$ indicate optical path difference function coefficients.

Example 1

Table 1 shows the lens data of Example 1. The Example 1 is designed to ensure that the magnification Mt of the entire optical system equals to 9 times, using the objective optical element having a focal distance of 3.1 mm with reference to the light flux having a wavelength λ1. One and the same optical detector can be installed for the light flux having wavelengths of λ1 and λ2. In this case, m1 (the magnification of the objective optical element) is 0.09. Deterioration of spherical aberration caused by changes in temperature and wavelength can be tolerated sufficiently. The M1 is 0.965.

TABLE 1

Example 1 Lens data (Objective lens)

| Focal distance | $f_1$ = 3.1 mm, | $f_2$ = 3.25 mm, | $f_3$ = 3.22 mm |
| Numerical aperture on the image surface side | NA1: 0.65, | NA2: 0.65, | NA3: 0.5 |
| Order of diffraction on two sides | dor: 2, | dor: 1, | dor: 1 |
| Magnification | m1: 1/11.1, | m2: 1/11.5, | m3: −1/32.25 |

| i-th surface | ri | di (407 nm) | ni (407 nm) | di (655 nm) | ni (655 nm) | di (785 nm) | ni (785 nm) |
|---|---|---|---|---|---|---|---|
| 1 | ∞ | 0.250 | | 0.250 | | 0.250 | |
| 2 | | 30.533 | | 30.533 | | 20.385 | |
| 3 | 30.229 | 1.200 | 1.55981 | 1.200 | 1.54073 | 1.200 | 1.53724 |
| 4 | −16.363 | 8.000 | | 7.875 | | 8.113 | |
| 5 (Aperture diameter) | ∞ | 0.0(φ3.757 mm) | | 0.0(φ3.960 mm) | | 0.0(φ3.264 mm) | |
| 6 | 1.9737 | 1.7600 | 1.55981 | 1.7600 | 1.54073 | 1.7600 | 1.53724 |
| 7 | −30.123 | 1.3487 | | 1.4739 | | 1.2362 | |
| 8 | ∞ | 1.0 | | 1.0 | | 1.0 | |
| 9 | ∞ | 0.6 | 1.61869 | 0.6 | 1.57752 | 1.2 | 1.57063 |

*di indicates the displacement from the i-th surface to the i + 1-th surface

| Aspherical data | |
|---|---|
| 4th surface Aspherical surface coefficient | |
| κ | −2.2565E−01 |
| A4 | 5.6940E−05 |
| 6th surface Aspherical surface coefficient | |
| κ | −4.9900E−01 |
| A4 | 7.6863E−04 |
| A6 | 1.1909E−03 |
| A8 | −1.5102E−04 |
| A10 | −5.2977E−05 |
| A12 | 2.7411E−05 |
| A14 | −4.5971E−06 |
| Optical path difference function | |
| B2 | −1.6504E+01 |
| B4 | −1.2420E+00 |
| B6 | 6.5208E−01 |
| B8 | −2.7560E−01 |
| B10 | 3.5696E−02 |

-continued

Aspherical data

7th surface
Aspherical surface coefficient

| | |
|---|---|
| κ | −3.7982E+01 |
| A4 | 7.5708E−03 |
| A6 | 2.0341E−03 |
| A8 | −2.4208E−03 |
| A10 | 6.6711E−04 |
| A12 | −8.3600E−05 |
| A14 | 3.8500E−06 |

Example 2

Table 2 shows the lens data of Example 2. The Example 2 is designed to ensure that the magnification Mt of the entire optical system equals to 8 times, using the objective optical element having a focal distance of 3.1 mm with reference to the light flux having a wavelength λ1. One and the same optical detector can be installed for the light flux having wavelengths of λ1 and λ2. In this case, m1 (the magnification of the objective optical element) is 0.03. Deterioration of spherical aberration caused by changes in wavelength can be tolerated sufficiently. Deterioration of spherical aberration caused by changes in temperature is 0.051 λrms. If the magnification m1 is smaller than 0.01, spherical aberration caused by changes in temperature will further deteriorate. This will make it difficult to keep the deterioration of the wavefront aberration of the entire optical pickup apparatus to 0.07 λrms. It is preferred to maintain m1≧0.01. The M1 is 0.863.

TABLE 2

Example 2 Lens data
(Objective lens)

| | | | | | | |
|---|---|---|---|---|---|---|
| Focal distance | | $f_1$ = 3.1 mm, | | $f_2$ = 3.27 mm, | | $f_3$ = 3.23 mm |
| Numerical aperture on the image surface side | | NA1: 0.65, | | NA2: 0.65, | | NA3: 0.5 |
| Order of diffraction on two sides | | dor: 2, | | dor: 1, | | dor: 1 |
| Magnification | | m1: 1/33.3, | | m2: 1/38.6, | | m3: −1/29.1 |

| i-th surface | ri | di (407 nm) | ni (407 nm) | di (655 nm) | ni (655 nm) | di (785 nm) | ni (785 nm) |
|---|---|---|---|---|---|---|---|
| 1 | ∞ | 0.250 | | 0.250 | | 0.250 | |
| 2 | | 25.248 | | 25.248 | | 16.738 | |
| 3 | 61.338 | 1.200 | 1.55981 | 1.200 | 1.54073 | 1.200 | 1.53724 |
| 4 | −14.440 | 8.000 | | 7.853 | | 8.079 | |
| 5 (Aperture diameter) | ∞ | 0.0(φ3.757 mm) | | 0.0(φ3.960 mm) | | 0.0(φ3.264 mm) | |
| 6 | 2.0631 | 1.7600 | 1.55981 | 1.7600 | 1.54073 | 1.7600 | 1.53724 |
| 7 | −17.946 | 1.5799 | | 1.7267 | | 1.5014 | |
| 8 | ∞ | 1.0 | | 1.0 | | 1.0 | |
| 9 | ∞ | 0.6 | 1.61869 | 0.6 | 1.57752 | 1.2 | 1.57063 |

*di indicates the displacement from the i-th surface to the i + 1-th surface

Aspherical data

4th surface
Aspherical surface coefficient

| | |
|---|---|
| κ | −9.7054E−01 |
| A4 | −6.1478E−06 |

-continued

Aspherical data

6th surface
Aspherical surface coefficient

| | |
|---|---|
| κ | −5.1678E−01 |
| A4 | 1.6034E−04 |
| A6 | 1.2865E−03 |
| A8 | −1.8443E−04 |
| A10 | −4.6272E−05 |
| A12 | 2.0366E−05 |
| A14 | −2.8021E−06 |

Optical path difference function

| | |
|---|---|
| B2 | −1.8838E+01 |
| B4 | −1.3220E+00 |
| B6 | 7.9896E−01 |
| B8 | −2.8058E−01 |
| B10 | 3.3125E−02 |

7th surface
Aspherical surface coefficient

| | |
|---|---|
| κ | −5.0826E+01 |
| A4 | 7.9886E−03 |
| A6 | 3.7823E−04 |
| A8 | −1.2395E−03 |
| A10 | 3.5209E−04 |
| A12 | −4.7328E−05 |
| A14 | 2.5668E−08 |

Example 3

Table 3 shows the lens data of Example 3. The Example 3 is designed to ensure that the magnification Mt of the entire optical system equals to 8 times, using the objective optical element having a focal distance of 1.6 mm with reference to the light flux having a wavelength λ1. One and the same optical detector can be installed for the light flux having wavelengths of λ1 and λ2. In this case, m1 (the magnification of the objective optical element) is 0.05. The working distance is 0.51 mm when recording and/or reproduction is carries out using the light having a wavelength of λ1. If the magnification m1 exceeds 0.08, the working distance will be smaller than 0.4 mm when the light flux having a wavelength of λ1 is used. This may cause interference between the optical disk and objective optical element. To prevent this, it is preferred to maintain m1≦0.08. The M1 is 0.901.

TABLE 3

Example 3 Lens data
(Objective lens)

| | | | | | | |
|---|---|---|---|---|---|---|
| Focal distance | | $f_1 = 1.60$ mm, | | $f_2 = 1.67$ mm, | | $f_3 = 1.66$ mm |
| Numerical aperture on the image surface side | | NA1: 0.65, | | NA2: 0.65, | | NA3: 0.5 |
| Order of diffraction on two sides | | dor: 2, | | dor: 1, | | dor: 1 |
| Magnification | | m1: 1/20, | | m2: 1/22.2, | | m3: −1/22.1 |

| i-th surface | ri | di (407 nm) | ni (407 nm) | di (655 nm) | ni (655 nm) | di (785 nm) | ni (785 nm) |
|---|---|---|---|---|---|---|---|
| 1 | ∞ | 0.250 | | 0.250 | | 0.250 | |
| 2 | | 14.376 | | 14.376 | | 7.505 | |
| 3 | 21.361 | 1.200 | 1.55981 | 1.200 | 1.54073 | 1.200 | 1.53724 |
| 4 | −8.250 | 7.000 | | 6.938 | | 7.181 | |
| 5 (Aperture diameter) | ∞ | 0.0(φ3.757 mm) | | 0.0(φ3.960 mm) | | 0.0(φ3.264 mm) | |
| 6 | 1.1014 | 1.7600 | 1.55981 | 1.7600 | 1.54073 | 1.7600 | 1.53724 |
| 7 | −4.621 | 0.5120 | | 0.5736 | | 0.3312 | |
| 8 | ∞ | | 1.0 | | 1.0 | | 1.0 |
| 9 | ∞ | 0.6 | 1.61869 | 0.6 | 1.57752 | 1.2 | 1.57063 |

*di indicates the displacement from the i-th surface to the i + 1-th surface

| Aspherical data | |
|---|---|
| 4th surface Aspherical surface coefficient | |
| κ | −1.2974E+00 |
| A4 | 5.9799E−05 |
| 6th surface Aspherical surface coefficient | |
| κ | −3.7428E−01 |
| A4 | 8.6466E−03 |
| A6 | −1.0999E−02 |
| A8 | 9.3742E−03 |
| A10 | −2.5528E−02 |
| A12 | 2.8464E−02 |
| A14 | −1.6700E−02 |
| Optical path difference function | |
| B2 | −2.6913E+01 |
| B4 | −3.9064E+00 |
| B6 | 5.0262E+00 |
| B8 | −1.0694E+01 |
| B10 | 5.1308E+00 |
| 7th surface Aspherical surface coefficient | |
| κ | −1.9020E+02 |
| A4 | −1.2866E−02 |

-continued

| Aspherical data | |
|---|---|
| A6 | 1.0803E−01 |
| A8 | −1.8127E−01 |
| A10 | 3.0724E−02 |
| A12 | 9.7512E−02 |
| A14 | −5.3372E−02 |

Example 4

Table 4 shows the lens data of Example 4. The Example 4 is designed to ensure that the magnification Mt of the entire optical system equals to 8 times, using the objective optical element having a focal distance of 1.75 mm with reference to the light flux having a wavelength λ1. One and the same optical detector can be installed for the light flux having wavelengths of λ1 and λ2. In this case, m1 (the magnification of the objective optical element) is 0.08. The working distance is 0.42 mm when recording and/or reproduction is carried out using the light having a wavelength of λ3. If the magnification m1 exceeds 0.08, the working distance will be smaller than 0.4 mm when the light flux having a wavelength of λ3 is used. This may cause interference between the optical disk and objective optical element. To prevent this, it is preferred to maintain m1≦0.08. The M1 is 0.926.

TABLE 4

Example 4 Lens data
(Objective lens)

| | | | | | | |
|---|---|---|---|---|---|---|
| Focal distance | | $f_1 = 1.75$ mm, | | $f_2 = 1.83$ mm, | | $f_3 = 1.82$ mm |
| Numerical aperture on the image surface side | | NA1: 0.65, | | NA2: 0.65, | | NA3: 0.5 |
| Order of diffraction on two sides | | dor: 2, | | dor: 1, | | dor: 1 |
| Magnification | | m1: 1/12.5, | | m2: 1/13.5, | | m3: −1/82.6 |

| i-th surface | ri | di (407 nm) | ni (407 nm) | di (655 nm) | ni (655 nm) | di (785 nm) | ni (785 nm) |
|---|---|---|---|---|---|---|---|
| 1 | ∞ | 0.250 | | 0.250 | | 0.250 | |
| 2 | | 16.959 | | 16.959 | | 9.714 | |
| 3 | 15.814 | 1.200 | 1.55981 | 1.200 | 1.54073 | 1.200 | 1.53724 |

TABLE 4-continued

| 4 | −9.435 | 7.000 | | 6.939 | | 7.170 | |
| 5 | ∞ | 0.0(φ2.106 mm) | | 0.0(φ2.206 mm) | | 0.0(φ1.878 mm) | |
| (Aperture diameter) | | | | | | | |
| 6 | 1.1314 | 1.1250 | 1.55981 | 1.1250 | 1.54073 | 1.1250 | 1.53724 |
| 7 | −6.969 | 0.5814 | | 0.6427 | | 0.4116 | |
| 8 | ∞ | | 1.0 | | 1.0 | | 1.0 |
| 9 | ∞ | 0.6 | 1.61869 | 0.6 | 1.57752 | 1.2 | 1.57063 |

*di indicates the displacement from the i-th surface to the i + 1-th surface

| Aspherical data |
| --- |
| 4th surface Aspherical surface coefficient |
| κ | −1.4397E+00 |
| A4 | 1.4619E−04 |
| 6th surface Aspherical surface coefficient |
| κ | −4.1600E−01 |
| A4 | 6.3685E−04 |
| A6 | 5.3607E−03 |
| A8 | 9.3304E−03 |
| A10 | −2.8906E−02 |
| A12 | 2.9314E−02 |
| A14 | −1.2821E−02 |
| Optical path difference function |
| B2 | −1.6276E+01 |
| B4 | −4.3912E+00 |
| B6 | 5.4311E+00 |
| B8 | −6.6164E+00 |
| B10 | 2.2933E+00 |
| 7th surface Aspherical surface coefficient |
| κ | −4.1013E+00 |
| A4 | 8.1275E−02 |
| A6 | −3.9648E−02 |
| A8 | 7.1530E−03 |
| A10 | −6.3145E−02 |
| A12 | 7.6417E−02 |
| A14 | −2.8099E−02 |

Table 5 shows the numerical values used in claims in Examples 1 through 4. In Table 5, (a) indicates the amount of changes in the wavefront aberration when the ambient temperature has risen 30° C. from the reference temperature (e.g. 25° C.), and (b) indicates the comatic aberration and astigmatism having occurred when the objective optical element has tracked 0.025 mm from the optical axis. (c) represents the distance of the operation between the objective optical element and HD, and (d) shows the change in the wavefront aberration when the wavelength of the light flux to be used is increased 5 nm from the reference wavelength.

TABLE 5

| Characteristics of the objective lens when λ is 407 nm | | | | |
| --- | --- | --- | --- | --- |
| | Example 1 | Example 2 | Example 3 | Example 4 |
| Focal distance | 3.1 | 3.1 | 1.6 | 1.7 |
| (a) +30° C. (λrms) | 0.035 | 0.051 | 0.012 | 0.013 |
| (b) Image height 0.025 mm (λrms) | 0.035 | 0.034 | 0.053 | 0.025 |
| (c) Working Distance | 1.58 | 1.35 | 0.51 | 0.58 |
| (d) +5 nm (λrms) | 0.013 | 0.023 | 0.004 | 0.003 |

Table 6 shows the lens data of the optical system in Examples 5 through 7. In this case, the eighth surface (aperture surface) of Table 6 corresponds to the first surface (aperture surface) in Examples 5 through 7. Namely, the optical system of Table 6 can be put into common use among Example 5 through 7. When the objective optical element is replaced, the seventh surface di is adjusted.

TABLE 6

| Lens data (optical system) | | | | | | | |
| --- | --- | --- | --- | --- | --- | --- | --- |
| Distance between subject and image | | U1: 41.23 mm | | U2: 41.23 mm | | U3: 41.83 mm | |
| Magnification of optical system | | m1: −1/8 | | m2: −1/7.86 | | m3: −1/208.3 | |
| i-th surface | ri | di (406 nm) | ni (406 nm) | di (661 nm) | ni (661 nm) | di (785 nm) | ni (785 nm) | Optical element name |
| 0 | | 0.00 | | 0.00 | | 0.00 | | |
| 1 | ∞ | 20.37 | | 20.37 | | 20.37 | | |
| 2 | ∞ | 4.00 | 1.5301 | 4.00 | 1.5142 | 4.00 | 1.5111 | Beam splitter |
| 3 | ∞ | 1.10 | 1.0 | 1.10 | 1.0 | 1.10 | 1.0 | |
| 4 | 158.9669 | 1.20 | 1.5586 | 1.20 | 1.5392 | 1.20 | 1.5359 | Coupling lens |
| 5 | −15.1352 | 3.00 | 1.0 | 3.00 | 1.0 | 3.00 | 1.0 | |
| 6 | ∞ | 0.50 | 1.5301 | 0.50 | 1.5142 | 0.50 | 1.5111 | Liquid crystal element |
| 7 | ∞ | 7.00 | 1.0 | 6.92 | 1.0 | 7.32 | 1.0 | |
| 8 (Aperture diameter) | ∞ | 0.0(φ4.03 mm) | | 0.0(φ4.03 mm) | | 0.0(φ4.03 mm) | | |

TABLE 6-continued

Aspherical data
5th surface
Aspherical surface coefficient

| | |
|---|---|
| κ | −1.0000E−01 |
| A4 | 2.1836E−05 |
| A6 | 7.1716E−08 |

*di indicates the displacement from the i-th surface to the i + 1-th surface

Example 5

Figure 10A:
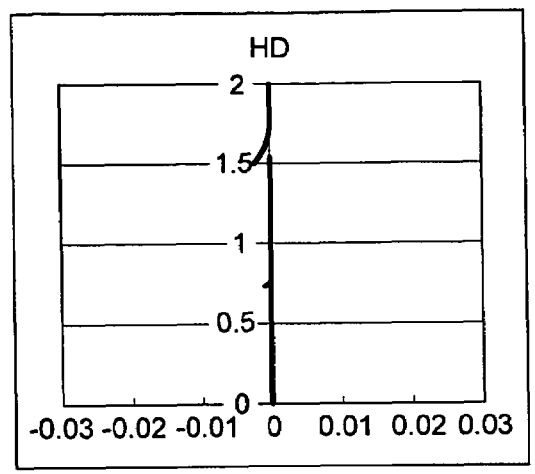
FIG. 10 is a diagram (a) of longitudinal spherical aberration for the HD, a diagram (b) of longitudinal spherical aberration for the DVD, and a diagram (c) of longitudinal spherical aberration for the CD when the optical system and objective optical element of the Example 5 is used.
Figure 10B:
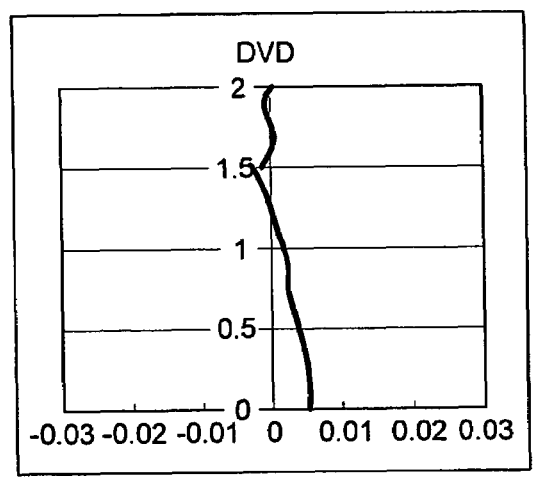
Figure 10C:
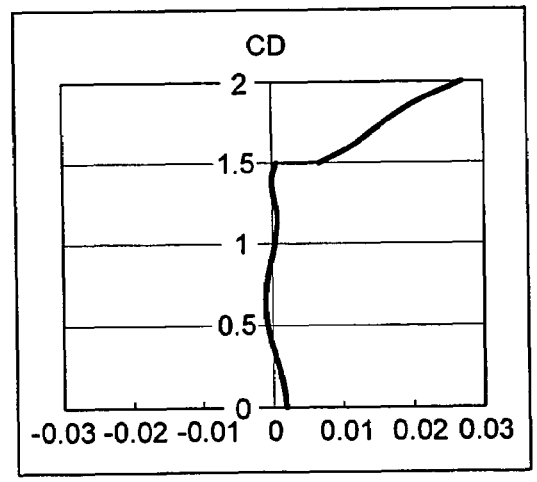

Table 7 shows the lens data of Example 5. FIG. 10 is a diagram (a) of longitudinal spherical aberration for the HD, a diagram (b) of longitudinal spherical aberration for the DVD, and a diagram (c) of longitudinal spherical aberration for the CD when the optical system and objective optical element of the Example 5 is used. It indicates the distance between the vertical axis and optical axis. In Example 5, the liquid crystal LCD is driven so that the spherical aberration will be somewhat excessive when the optical system magnification of the objective optical element on the CD side is 0. In this case, m1−0.06=−0.06, m2=−0.004. This meets the requirement of m1−0.06≦m2.

TABLE 7

Example 5: Objective lens data

| | | | | | | | |
|---|---|---|---|---|---|---|---|
| Focal distance of the objective lens | | $f_1$ = 3.1 mm, | | $f_2$ = 3.19 mm, | | $f_3$ = 3.18 mm | |
| Numerical aperture on the image surface side | | NA1: 0.65, | | NA2: 0.629, | | NA3: 0.51 | |
| Magnification of optical system of objective lens | | m1: 0, | | m2: −1/243.9, | | m3: −1/208.3 | |
| i-th surface | ri | di (406 nm) | ni (406 nm) | di (661 nm) | ni (661 nm) | di (785 nm) | ni (785 nm) | Optical element name |
| 0 | ∞ | ∞ | | 782.00 | | 662.00 | | |
| 1 (Aperture diameter) | ∞ | 0.0(φ4.03 mm) | | 0.0(φ4.03 mm) | | 0.0(φ4.03 mm) | | |
| 2″ | 2.0612 | 0.007008 | 1.5586 | 0.007008 | 1.5392 | 0.007008 | 1.5359 | Objective lens |
| 2′ | 1.9727 | 0.000674 | 1.5586 | 0.000674 | 1.5392 | 0.000674 | 1.5359 | |
| 2 | 2.0077 | 1.76 | 1.5586 | 1.76 | 1.5392 | 1.76 | 1.5359 | |
| 3′ | −17.1088 | 0.000000 | 1.0 | 0.000000 | 1.0 | 0.000000 | 1.0 | |
| 3 | −12.6100 | 1.704 | 1.0 | 1.780 | 1.0 | 1.388 | 1.0 | |
| 4 | ∞ | 0.6 | 1.6191 | 0.6 | 1.5771 | 1.2 | 1.5706 | Optical disk |
| 5 | ∞ | 0.000000 | 1.0 | 0.000000 | 1.0 | 0.000000 | 1.0 | |

*di indicates the displacement from the i-th surface to the i + 1-th surface.
*di′ to di″ indicate the displacement from the i′-th to i″-th surfaces to the i-th surface.

| 2nd″ surface (1.51775 mm ≦ h ≦ 1.7 mm) Aspherical surface coefficient | |
|---|---|
| κ | −5.4387E−01 |
| A4 | 1.1120E−03 |
| A6 | 3.5350E−04 |
| A8 | −3.0945E−04 |
| A10 | 8.8361E−05 |
| A12 | 3.5154E−06 |
| A14 | −3.3845E−06 |
| Optical path difference function (HD DVD dor = 3 DVD dor = 2) | |
| λB | 422 nm |
| B2 | −2.2970E−03 |
| B4 | −1.3563E−03 |
| B6 | 5.3188E−04 |
| B8 | −1.2513E−04 |
| B10 | 9.9897E−06 |
| 2nd′ surface (0.76236 mm ≦ h < 1.51775 mm) Aspherical surface coefficient | |
| κ | −9.8620E−01 |
| A4 | −5.9609E−03 |
| A6 | 1.4498E−02 |
| A8 | −9.1552E−03 |
| A10 | 3.4456E−03 |
| A12 | −7.0899E−04 |
| A14 | 6.1499E−05 |
| Optical path difference function (HD DVD dor = 3 DVD dor = 2 CD dor = 2) | |
| λB | 430 nm |
| B2 | −2.5954E−03 |
| B4 | −7.5161E−04 |
| B6 | 2.8811E−04 |
| B8 | −1.3651E−04 |
| B10 | 1.9409E−05 |
| 2nd surface (0 mm ≦ h < 0.76236 mm) Aspherical surface coefficient | |
| κ | −6.0821E−01 |
| A4 | −1.6245E−03 |
| A6 | 1.7726E−03 |
| A8 | −5.3655E−04 |
| A10 | 2.2816E−05 |

-continued

| | |
|---|---|
| A12 | 1.0450E−05 |
| A14 | −7.8834E−07 | tance from the optical axis. In Example 6, the liquid crystal element LCD is driven to ensure that the spherical aberration will be zero when the optical system magnification of the objective optical element on the CD side is 0. It should be noted that m1−0.06=−0.06, m2=−0.004. Thus, requirement m1−0.06≦m2 is met.

TABLE 8

Example 6: Objective lens data

| Focal distance of the objective lens | $f_1$ = 3.1 mm, | $f_2$ = 3.19 mm, | $f_3$ = 3.18 mm |
|---|---|---|---|
| Numerical aperture on the image surface side | NA1: 0.65, | NA2: 0.629, | NA3: 0.51 |
| Magnification of optical system of objective lens | m1:0, | m2: −1/243.9, | m3: 0 |

| i-th surface | ri | di (406 nm) | ni (406 nm) | di (661 nm) | ni (661 nm) | di (785 nm) | ni (785 nm) | Optical element name |
|---|---|---|---|---|---|---|---|---|
| 0 | ∞ | ∞ | | 782.00 | | 662.00 | | |
| 1 (Aperture diameter) | ∞ | 0.0(φ4.03 mm) | | 0.0(φ4.03 mm) | | 0.0(φ4.03 mm) | | |
| 2″ | 2.0849 | 0.009443 | 1.5586 | 0.009443 | 1.5392 | 0.009443 | 1.5359 | Objective lens |
| 2′ | 1.9834 | 0.000735 | 1.5586 | 0.000735 | 1.5392 | 0.000735 | 1.5359 | |
| 2 | 2.0025 | 1.76 | 1.5586 | 1.76 | 1.5392 | 1.76 | 1.5359 | |
| 3′ | −12.2040 | 0.000000 | 1.0 | 0.000000 | 1.0 | 0.000000 | 1.0 | |
| 3 | −12.6854 | 1.705 | 1.0 | 1.781 | 1.0 | 1.375 | 1.0 | |
| 4 | ∞ | 0.6 | 1.6191 | 0.6 | 1.5771 | 1.2 | 1.5706 | Optical disk |
| 5 | ∞ | 0.000000 | 1.0 | 0.000000 | 1.0 | 0.000000 | 1.0 | |

*di indicates the displacement from the i-th surface to the i + 1-th surface.
*di′ to di″ indicate the displacement from the i′-th to i″-th surfaces to the i-th surface.

-continued

| Optical path difference function (HD DVD dor = 3 DVD dor = 2 CD dor = 2) | |
|---|---|
| λB | 430 nm |
| B2 | −2.5954E−03 |
| B4 | −7.5161E−04 |
| B6 | 2.8811E−04 |
| B8 | −1.3651E−04 |
| B10 | 1.9409E−05 |
| 3rd′ surface (1.173 mm ≦ h) Aspherical surface coefficient | |
| κ | −8.3641E−03 |
| A4 | 1.2800E−02 |
| A6 | −5.0340E−03 |
| A8 | 9.3303E−04 |
| A10 | −9.0571E−05 |
| A12 | 3.4790E−06 |
| A14 | 0.0000E+00 |
| 3rd surface (0 mm ≦ h < 1.173 mm) Aspherical surface coefficient | |
| κ | 3.4758E−03 |
| A4 | −2.9566E−03 |
| A6 | 9.9039E−04 |
| A8 | −1.7299E−04 |
| A10 | 1.2658E−05 |
| A12 | 0.0000E+00 |
| A14 | 0.0000E+00 |

Example 6

Figure 11A:
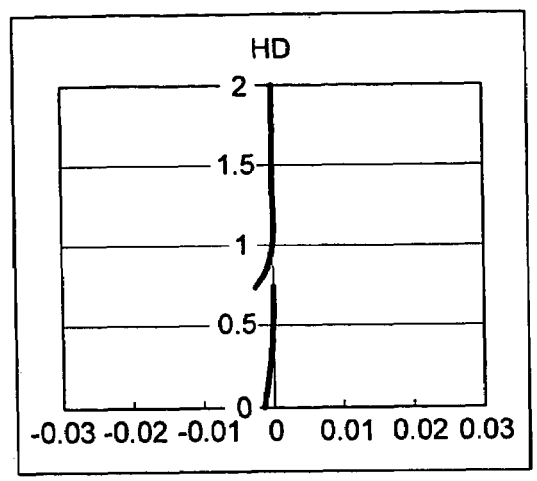
FIG. 11 is a diagram (a) of longitudinal spherical aberration for the HD, a diagram (b) of longitudinal spherical aberration for the DVD, and a diagram (c) of longitudinal spherical aberration for the CD when the optical system and objective optical element of the Example 6 is used.
Figure 11B:
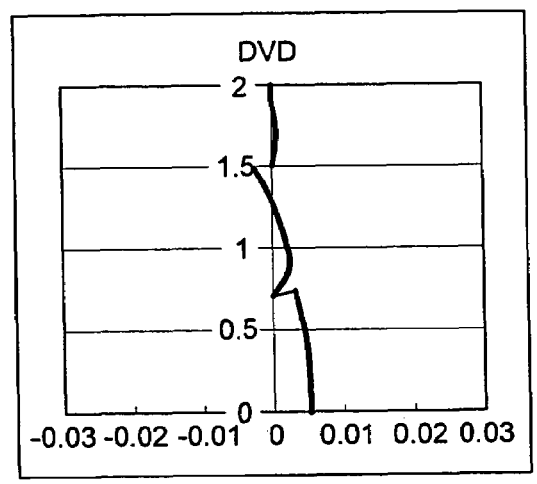
Figure 11C:
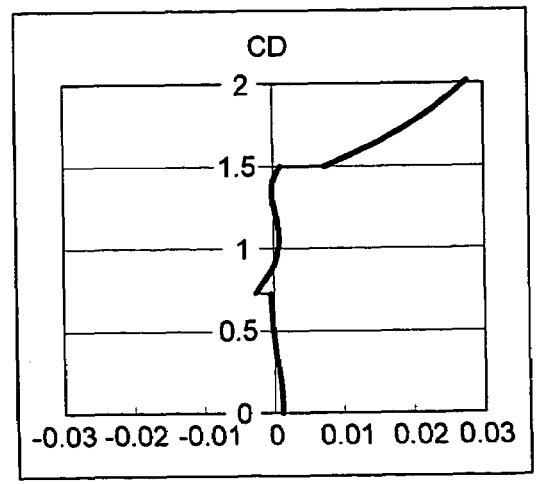

Table 8 shows the lens data of Example 6. FIG. 11 is a diagram (a) of longitudinal spherical aberration for the HD, a diagram (b) of longitudinal spherical aberration for the DVD, and a diagram (c) of longitudinal spherical aberration for the CD when the optical system and objective optical element of the Example 6 is used. Each vertical axis indicates the dis-

| 2nd″ surface (1.49423 mm ≦ h ≦ 1.7 mm) Aspherical surface coefficient | |
|---|---|
| κ | −5.2285E−01 |
| A4 | 6.0517E−04 |
| A6 | 1.0029E−03 |
| A8 | −2.9099E−04 |
| A10 | 5.2256E−05 |
| A12 | −2.7490E−06 |
| A14 | −1.3365E−06 |
| Optical path difference function (HD DVD dor = 3 DVD dor = 2) | |
| λB | 422 nm |
| B2 | −1.6502E−03 |
| B4 | −1.8206E−03 |
| B6 | 5.8930E−04 |
| B8 | −1.0267E−04 |
| B10 | 5.6390E−06 |
| 2nd′ surface (0.772207 mm ≦ h < 1.49423 mm) Aspherical surface coefficient | |
| κ | −9.1196E−01 |
| A4 | −1.5359E−04 |
| A6 | 2.9274E−03 |
| A8 | 5.5592E−04 |
| A10 | −1.1435E−03 |
| A12 | 4.3411E−04 |
| A14 | −5.4670E−05 |
| Optical path difference function (HD DVD dor = 3 DVD dor = 2 CD dor = 2) | |
| λB | 430 nm |
| B2 | −2.5000E−03 |
| B4 | −7.7617E−04 |
| B6 | 3.0705E−04 |
| B8 | −1.6045E−04 |
| B10 | 2.5610E−05 |

-continued

| 2nd surface (0 mm ≦ h < 0.772207 mm) Aspherical surface coefficient | |
|---|---|
| κ | −8.3484E−01 |
| A4 | 1.2793E−03 |
| A6 | 2.5812E−03 |
| A8 | −1.0628E−03 |
| A10 | 2.4537E−04 |
| A12 | −3.2266E−05 |
| A14 | 3.0781E−06 |

Example 7

Figure 12A:
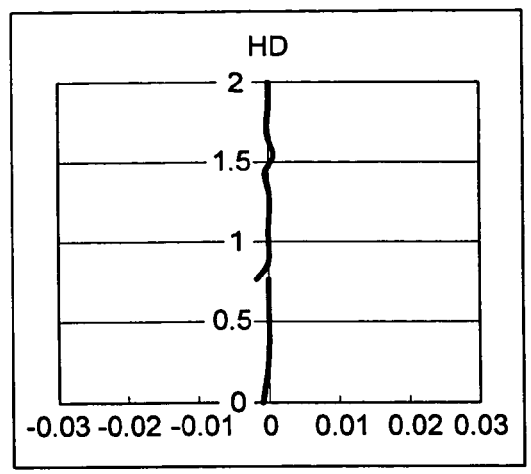
FIG. 12 is a diagram (a) of longitudinal spherical aberration for the HD, a diagram (b) of longitudinal spherical aberration for the DVD, and a diagram (c) of longitudinal spherical aberration for the CD when the optical system and objective optical element of the Example 7 is used.
Figure 12B:
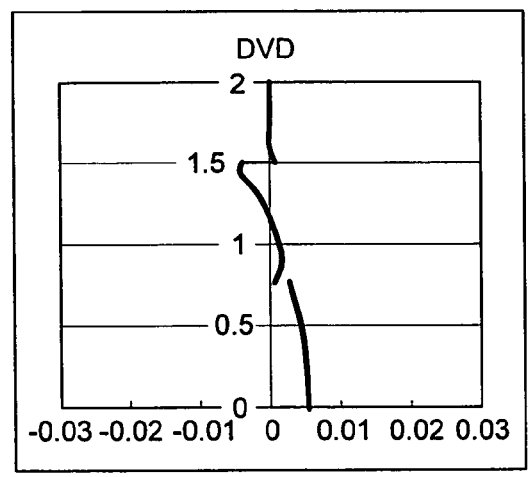
Figure 12C:
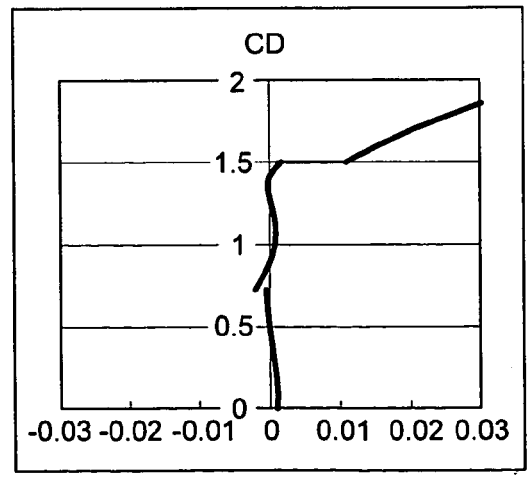

Table 9 shows the lens data of Example 6. FIG. 12 is a diagram (a) of longitudinal spherical aberration for the HD, a diagram (b) of longitudianal spherical aberration for the DVD, and a diagram (c) of longitudinal spherical aberration for the CD when the optical system and objective optical element of the Example 7 is used. In Example 7, when the optical system magnification of the objective optical element on the CD side is 0, the liquid crystal element LCD is driven to ensure that the spherical aberration will be somewhat insufficient. It should be noted that m1−0.06=−0.06, m2=−0.004. Thus, the requirements of m1−0.06≦m2 is met.

TABLE 9

Example 7: Objective lens data

| Focal distance of the objective lens | $f_1$ = 3.1 mm, | $f_2$ = 3.19 mm, | $f_3$ = 3.18 mm |
|---|---|---|---|
| Numerical aperture on the image surface side | NA1: 0.65, | NA2: 0.629, | NA3: 0.51 |
| Magnification of optical system of objective lens | m1: 0, | m2: −1/243.9, | m3: 1/100 |

| i-th surface | ri | di (406 nm) | ni (406 nm) | di (661 nm) | ni (661 nm) | di (785 nm) | ni (785 nm) | Optical element name |
|---|---|---|---|---|---|---|---|---|
| 0 | | ∞ | | 782.00 | | −315.00 | | |
| 1 (Aperture diameter) | ∞ | 0.0(φ4.03 mm) | | 0.0(φ4.03 mm) | | 0.0(φ4.03 mm) | | |
| 2″ | 2.0915 | 0.015927 | 1.5586 | 0.015927 | 1.5392 | 0.015927 | 1.5359 | Objective |
| 2′ | 1.9804 | 0.000719 | 1.5586 | 0.000719 | 1.5392 | 0.000719 | 1.5359 | lens |
| 2 | 2.0031 | 1.76 | 1.5586 | 1.76 | 1.5392 | 1.76 | 1.5359 | |
| 3′ | −16.8211 | 0.000000 | 1.0 | 0.000000 | 1.0 | 0.000000 | 1.0 | |
| 3 | −12.6518 | 1.705 | 1.0 | 1.781 | 1.0 | 1.343 | 1.0 | |
| 4 | ∞ | 0.6 | 1.6191 | 0.6 | 1.5771 | 1.2 | 1.5706 | Optical disk |
| 5 | ∞ | 0.000000 | 1.0 | 0.000000 | 1.0 | 0.000000 | 1.0 | |

*di indicates the displacement from the i-th surface to the i + 1-th surface.
*di′ to di″ indicate the displacement from the i′-th to i″-th surfaces to the i-th surface.

-continued

| Optical path difference function (HD DVD dor = 3 DVD dor = 2 CD dor = 2) | |
|---|---|
| λB | 430 nm |
| B2 | −2.5000E−03 |
| B4 | −7.7617E−04 |
| B6 | 3.0705E−04 |
| B8 | −1.6045E−04 |
| B10 | 2.5610E−05 |
| 3rd′ surface (1.149 mm ≦ h) Aspherical surface coefficient | |
| κ | 7.8363E−03 |
| A4 | 1.5106E−03 |
| A6 | −1.6435E−03 |
| A8 | 4.3024E−04 |
| A10 | −5.5290E−05 |
| A12 | 2.8299E−06 |
| A14 | 0.0000E+00 |
| 3rd surface (0 mm ≦ h < 1.149 mm) Aspherical surface coefficient | |
| κ | 1.5118E−03 |
| A4 | −1.7358E−03 |
| A6 | 4.5341E−04 |
| A8 | −5.3119E−05 |
| A10 | 2.4480E−06 |
| A12 | 0.0000E+00 |
| A14 | 0.0000E+00 |

| 2nd″ surface (1.49903 mm ≦ h ≦ 1.7 mm) Aspherical surface coefficient | |
|---|---|
| κ | −5.4567E−01 |
| A4 | 6.8531E−04 |
| A6 | 6.9190E−04 |
| A8 | −2.6016E−04 |
| A10 | 8.2993E−05 |
| A12 | −5.7627E−07 |
| A14 | −2.7645E−06 |
| Optical path difference function (HD DVD dor = 3 DVD dor = 2) | |
| λB | 422 nm |
| B2 | −1.2214E−03 |
| B4 | −2.0523E−03 |
| B6 | 5.9821E−04 |
| B8 | −9.3727E−05 |
| B10 | 4.7083E−06 |
| 2nd′ surface (0.76715 mm ≦ h < 1.49903 mm) Aspherical surface coefficient | |
| κ | −9.9928E−01 |
| A4 | 3.0312E−05 |
| A6 | 4.0800E−03 |
| A8 | 3.5739E−04 |
| A10 | −1.5047E−03 |
| A12 | 6.4561E−04 |
| A14 | −8.9264E−05 |

-continued

Optical path difference function
(HD DVD dor = 3 DVD dor = 2 CD dor = 2)

| λB | 430 nm |
|---|---|
| B2 | −2.5000E−03 |
| B4 | −8.5761E−04 |
| B6 | 3.2933E−04 |
| B8 | −1.7310E−04 |
| B10 | 2.7839E−05 |

2nd surface (0 mm ≦ h < 0.76715 mm)
Aspherical surface coefficient

| κ | −8.7489E−01 |
|---|---|
| A4 | 1.9384E−03 |
| A6 | 2.5570E−03 |
| A8 | −1.0673E−03 |
| A10 | 2.3108E−04 |
| A12 | −2.8037E−05 |
| A14 | 3.0528E−06 |
| κ | −2.8046E+02 |

Optical path difference function
(HD DVD dor = 3 DVD dor = 2 CD dor = 2)

| λB | 430 nm |
|---|---|
| B2 | −2.5000E−03 |
| B4 | −8.5761E−04 |
| B6 | 3.2933E−04 |
| B8 | −1.7310E−04 |
| B10 | 2.7839E−05 |

3rd' surface (1.152 mm ≦ h)
Aspherical surface coefficient

| κ | −7.8458E−03 |
|---|---|
| A4 | 1.2516E−02 |
| A6 | −5.0584E−03 |
| A8 | 9.5306E−04 |
| A10 | −9.1145E−05 |
| A12 | 3.2943E−06 |
| A14 | 0.0000E+00 |

3rd surface (0 mm ≦ h < 1.152 mm)
Aspherical surface coefficient

| κ | 1.1305E−04 |
|---|---|
| A4 | −1.1017E−03 |
| A6 | 3.1700E−04 |
| A8 | −3.7493E−05 |
| A10 | 1.6668E−06 |
| A12 | 0.0000E+00 |
| A14 | 0.0000E+00 |

The present invention is not restricted to the aforementioned embodiments and examples. For example, the present invention is applicable to the optical pickup apparatus capable of recording and/or reproduction of information compatibly with the BD and DVD or CD, as well to the optical pickup apparatus capable of recording and/or reproduction of information compatibly with all of the BD, DVD and CD.

Other various embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical pickup apparatus which conducts reproducing and/or recording information for a first optical information recording medium comprising a first protective substrate whose thickness is t1 and conducts reproducing and/or recording information for a second optical information recording medium comprising a second protective substrate whose thickness is t2 (t1≦t2), the optical pickup apparatus comprising:

a first light source to emit a first light flux having a wavelength λ1 (350≦λ1 (nm)≦480) for recording and/or reproducing the first optical information recording medium;

a second light source to emit a second light flux having a wavelength λ2 (λ1<λ2) for recording and/or reproducing the second optical information recording medium;

an output angle conversion element to convert an output angle of the first light flux and the second light flux which is incident to the output angle conversion element, wherein the output angle conversion element is placed fixedly in an optical path which is common to the first light flux and the second light flux and the output angle conversion element is a single lens;

an objective optical element to converge the first light flux onto an information recording plane of the first optical information recording medium and the second light flux onto an information recording plane of the second optical information recording medium;

a separation element to separate the first light flux and the second light flux which are output from the first light source and the second light source from the first light flux and the second light flux which are reflected on the information recording planes of the first optical information recording medium and the second optical information recording medium; and an optical detector to receive both of the first light flux and the second light flux which are reflected on the information recording planes of the first optical information recording medium and the second optical information recording medium, wherein both optical surfaces of the output angle conversion element are refractive surfaces, and wherein at least one optical surface of the objective optical element comprises a step structure in which patterns are arranged to be in a form of concentric circles whose center is on an optical axis of the objective optical element and the following formula is satisfied:

$$3 \times \lambda1/(n1-1) \leq d \leq 2 \times \lambda2/(n2-1),$$

where d represents an average depth of the step structures, n1 represents a refraction index of the objective optical element for the first light flux, and n2 represents a refraction index of the objective optical element for the second light flux.

2. The optical pickup apparatus of claim 1, wherein the following formula is satisfied:

$$0 \leq M1 < 1,$$

$$|m1| \leq 0.091,$$

where M1 represents m2/m1, m1 represents an optical magnification of the objective optical element for the first light flux for recording and/or reproducing the first optical information recording medium and m2 represents an optical magnification of the objective optical element for the second light flux for recording and/or reproducing the second optical information recording medium.

3. The optical pickup apparatus of claim 2, wherein the following formula is satisfied:

$$0.5 \leq M1 < 1,$$

$$|m1| \leq 0.06.$$

4. The optical pickup apparatus of claim 1, wherein the following formula is satisfied:

$$m1 - 0.06 \leq m2,$$
$$0 \leq m1,$$
$$m2 \leq 0,$$

where m1 represents an optical magnification of the objective optical element for the first light flux for recording and/or reproducing the first optical information recording medium and m2 represents an optical magnification of the objective optical element for the second light flux for recording and/or reproducing the second optical information recording medium.

5. The optical pickup apparatus of claim 1, wherein the following formula is satisfied:

$$1.60 \leq f1 \text{ (mm)} \leq 4.00,$$

where f1 represents a focal length of the objective optical element for the first light flux.

6. The optical pickup apparatus of claim 1, wherein the optical pickup apparatus conducts reproducing and/or recording information for a third optical information recording medium comprising a third protective substrate whose thickness is t3 (t2<t3), and
wherein the optical pickup apparatus comprises a third light flux to emit a third light flux having a wavelength λ3 (λ2<λ3) for recording and/or reproducing the third optical information recording medium.

7. The optical pickup apparatus of claim 6, wherein the following formula is satisfied:

$$0.01 \leq m1$$

where m1 represents an optical magnification of the objective optical element for the first light flux for recording and/or reproducing the first optical information recording medium.

8. The optical pickup apparatus of claim 1, wherein the optical pickup apparatus comprises a liquid crystal element in the optical path between the output angle conversion element and the objective optical element, and wherein the liquid crystal element changes amount of a phase difference providing to the first light flux and the second light flux having passed the liquid crystal element by changing the state of voltage application.

9. An optical information recording and/or reproducing apparatus which conducts reproducing and/or recording information for a first optical information recording medium comprising a first protective substrate whose thickness is t1 and conducts reproducing and/or recording information for a second optical information recording medium comprising a second protective substrate whose thickness is t2 (t1≦t2), the optical information reproducing and/or recording apparatus, comprising:
an optical pickup apparatus, comprising:
a first light source to emit a first light flux having a wavelength λ1 (350≦λ1 (nm)≦480) for recording and/or reproducing the first optical information recording medium;
a second light source to emit a second light flux having a wavelength λ2 (λ1<λ2) for recording and/or reproducing the second optical information recording medium;
an output angle conversion element to convert an output angle of the first light flux and the second light flux which is incident to the output angle conversion element, wherein the output angle conversion element is placed fixedly in an optical path which is common to the first light flux and the second light flux and the output angle conversion element is a single lens,
an objective optical element to converge the first light flux onto an information recording plane of the first optical information recording medium and the second light flux onto an information recording plane of the second optical information recording medium, and
a separation element to separate the first light flux and the second light flux which are output from the first light source and the second light source from the first light flux and the second light flux which are reflected on the information recording planes of the first optical information recording medium and the second optical information recording medium; and
an optical detector to receive both of the first light flux and the second light flux which are reflected on the information recording planes of the first optical information recording medium and the second optical information recording medium,
wherein both optical surfaces of the output angle conversion element are refractive surfaces, and
wherein at least one optical surface of the objective optical element comprises a step structure in which patterns are arranged to be in a form of concentric circles whose center is on an optical axis of the objective optical element and the following formula is satisfied:

$$3 \times \lambda 1/(n1-1) \leq d \leq 2 \times \lambda 2/(n2-1),$$

where d represents an average depth of the step structures, n1 represents a refraction index of the objective optical element for the first light flux, and n2 represents a refraction index of the objective optical element for the second light flux.

10. An optical pickup apparatus which conducts reproducing and/or recording information for a first optical information recording medium comprising a first protective substrate whose thickness is t1 and conducts reproducing and/or recording information for a second optical information recording medium comprising a second protective substrate whose thickness is t2 (t1≦t2), the optical pickup apparatus comprising:
a first light source to emit a first light flux having a wavelength λ1 (350≦λ1 (nm)≦480) for recording and/or reproducing the first optical information recording medium;
a second light source to emit a second light flux having a wavelength λ2 (λ1<λ2) for recording and/or reproducing the second optical information recording medium;
an output angle conversion element to convert an output angle of the first light flux and the second light flux which is incident to the output angle conversion element, wherein the output angle conversion element is placed fixedly in an optical path which is common to the first light flux and the second light flux and the output angle conversion element is a single lens,
an objective optical element to converge the first light flux onto an information recording plane of the first optical information recording medium and the second light flux onto an information recording plane of the second optical information recording medium, and
a separation element to separate the first light flux and the second light flux which are output from the first light source and the second light source from the first light flux and the second light flux which are reflected on the information recording planes of the first optical information recording medium and the second optical information recording medium, and at least one optical detector to receive the first light flux and/or the second light flux which are reflected on the information recording planes of the first optical information recording medium and the second optical information recording medium, and wherein both optical surfaces of the output angle conversion element are refractive surfaces, and wherein the following formula is satisfied:

$$0.9 \times l1 \leq l2 \leq 1.1 \times l1$$

where l1 represents an optical path length between the first light source and the output angle conversion element and l2 represents an optical path length between the second light source and the output angle conversion element.

11. The optical pickup apparatus of claim 10, wherein the following formula is satisfied:

$$0 \leq M1 < 1,$$

$$|m1| \leq 0.091,$$

where M1 represents m2/m1, m1 represents an optical magnification of the objective optical element for the first light flux for recording and/or reproducing the first optical information recording medium and m2 represents an optical magnification of the objective optical element for the second light flux for recording and/or reproducing the second optical information recording medium.

12. The optical pickup apparatus of claim 11, wherein the following formula is satisfied:

$$0.5 \leq M1 \leq 1,$$

$$|m1| \leq 0.06.$$

13. The optical pickup apparatus of claim 10, wherein the following formula is satisfied:

$$m1 - 0.06 \leq m2,$$

$$0 \leq m1,$$

$$m2 \leq 0,$$

where m1 represents an optical magnification of the objective optical element for the first light flux for recording and/or reproducing the first optical information recording medium and m2 represents an optical magnification of the objective optical element for the second light flux for recording and/or reproducing the second optical information recording medium.

14. The optical pickup apparatus of claim 10, wherein the following formula is satisfied:

$$1.60 \leq f1(mm) \leq 4.00,$$

where f1 represents a focal length of the objective optical element for the first light flux.

15. An optical information recording and/or reproducing apparatus which conducts reproducing and/or recording information for a first optical information recording medium comprising a first protective substrate whose thickness is t1 and conducts reproducing and/or recording information for a second optical information recording medium comprising a second protective substrate whose thickness is t2 (t1 ≦ t2), the optical information reproducing and/or recording apparatus, comprising:

an optical pickup apparatus, comprising:

a first light source to emit a first light flux having a wavelength λ1 (350 ≦ λ1 (nm) ≦ 480) for recording and/or reproducing the first optical information recording medium;

a second light source to emit a second light flux having a wavelength λ2 (λ1 < λ2) for recording and/or reproducing the second optical information recording medium;

an output angle conversion element to convert an output angle of the first light flux and the second light flux which is incident to the output angle conversion element, wherein the output angle conversion element is placed fixedly in an optical path which is common to the first light flux and the second light flux and the output angle conversion element is a single lens, an objective optical element to converge the first light flux onto an information recording plane of the first optical information recording medium and the second light flux onto an information recording plane of the second optical information recording medium, and a separation element to separate the first light flux and the second light flux which are output from the first light source and the second light source from the first light flux and the second light flux which are reflected on the information recording planes of the first optical information recording medium and the second optical information recording medium, and at least one optical detector to receive the first light flux and/or the second light flux which are reflected on the information recording planes of the first optical information recording medium and the second optical information recording medium, and wherein both optical surfaces of the output angle conversion element are refractive surfaces, and wherein the following formula is satisfied:

$$0.9 \times l1 \leq l2 \leq 1.1 \times l1$$

where l1 represents an optical path length between the first light source and the output angle conversion element and l2 represents an optical path length between the second light source and the output angle conversion element.

16. An optical pickup apparatus which conducts reproducing and/or recording information for a first optical information recording medium comprising a first protective substrate whose thickness is t1 and conducts reproducing and/or recording information for a second optical information recording medium comprising a second protective substrate whose thickness is t2 (t1 ≦ t2), the optical pickup apparatus comprising:

a first light source to emit a first light flux having a wavelength λ1 (350 ≦ λ1 (nm) ≦ 480) for recording and/or reproducing the first optical information recording medium;

a second light source to emit a second light flux having a wavelength λ2 (λ1 < λ2) for recording and/or reproducing the second optical information recording medium;

an output angle conversion element to convert an output angle of the first light flux and the second light flux which is incident to the output angle conversion element, wherein the output angle conversion element is placed fixedly in an optical path which is common to the first light flux and the second light flux and the output angle conversion element is a single lens;

an objective optical element to converge the first light flux onto an information recording plane of the first optical information recording medium and the second light flux onto an information recording plane of the second optical information recording medium;

a separation element to separate the first light flux and the second light flux which are output from the first light source and the second light source from the first light flux and the second light flux which are reflected on the information recording planes of the first optical information recording medium and the second optical information recording medium; and an optical detector to receive both of the first light flux and the second light flux which are reflected on the information recording planes of the first optical information recording medium and the second optical information recording medium, wherein both optical surfaces of the output angle conversion element are refractive surfaces, and wherein at least one optical surface of the objective optical element comprises a step structure in which patterns are arranged to be in a form of concentric circles whose center is on an optical axis of the objective optical element and the following formula is satisfied:

$$1 \times \lambda 2/(n2-1) \leq d \leq 2 \times \lambda 1/(n1-1)$$

where d represents an average depth of the step structures, n1 represents a refraction index of the objective optical element for the first light flux, and n2 represents a refraction index of the objective optical element for the second light flux.

17. The optical pickup apparatus of claim 16, wherein the following formula is satisfied:

$$0 \leq M1 < 1,$$

$$|m1| \leq 0.091,$$

wherein M1 represents m2/m1, m1 represents an optical magnification of the objective optical element for the first light flux for recording and/or reproducing the first optical information recording medium, and m2 represents an optical magnification of the objective optical element for the second light flux for recording and/or reproducing the second optical information recording medium.

18. The optical pickup apparatus of claim 17, wherein the following formula is satisfied:

$$0.5 \leq M1 < 1,$$

$$|m1| \leq 0.06.$$

19. The optical pickup apparatus of claim 16, wherein the following formula is satisfied:

$$m1 - 0.06 \leq m2,$$

$$0 \leq m1,$$

$$m2 \leq 0,$$

wherein m1 represents an optical magnification of the objective optical element for the first light flux for recording and/or reproducing the first optical information recording medium and m2 represents an optical magnification of the objective optical element for the second light flux for recording and/or reproducing the second optical information recording medium.

20. The optical pickup apparatus of claim 16, wherein the following formula is satisfied:

$$1.60 \leq f1(mm) \leq 4.00,$$

where f1 represents a focal length of the objective optical element for the first light flux.

21. The optical pickup apparatus of claim 16, wherein the optical pickup apparatus conducts reproducing and/or recording information for a third optical information recording medium comprising a third protective substrate whose thickness is t3 (t2<t3), and wherein the optical pickup apparatus comprises a third light flux to emit a third light flux having a wavelength λ3 (λ2<λ3) for recording and/or reproducing the third optical information recording medium.

22. The optical pickup apparatus of claim 21, wherein the following formula is satisfied:

$$0.01 \leq m1,$$

where m1 represents an optical magnification of the objective optical element for the first light flux for recording and/or reproducing the first optical information recording medium.

23. The optical pickup apparatus of claim 16, wherein the optical pickup apparatus comprises a liquid crystal element in the optical path between the output angle conversion element and the objective optical element, and wherein the liquid crystal element changes an amount of a phase difference of the first light flux and the second light flux upon transmission through the liquid crystal element by changing the state of voltage application.

24. An optical information recording and/or reproducing apparatus which conducts reproducing and/or recording information for a first optical information recording medium comprising a first protective substrate whose thickness is t1 and conducts reproducing and/or recording information for a second optical information recording medium comprising a second protective substrate whose thickness is t2 (t1 ≤t2), the optical information reproducing and/or recording apparatus comprising:

an optical pickup apparatus comprising:

a first light source to emit a first light flux having a wavelength λ1 (350≤λ1 (nm)≤480) for recording and/or reproducing the first optical information recording medium;

a second light source to emit a second light flux having a wavelength λ2 (λ1<λ2) for recording and/or reproducing the second optical information recording medium;

an output angle conversion element to convert an output angle of the first light flux and the second light flux which is incident to the output angle conversion element, wherein the output angle conversion element is placed fixedly in an optical path which is common to the first light flux and the second light flux and the output angle conversion element is a single lens;

an objective optical element to converge the first light flux onto an information recording plane of the first optical information recording medium and the second light flux onto an information recording plane of the second optical information recording medium;

a separation element to separate the first light flux and the second light flux which are output from the first light source and the second light source from the first light flux and the second light flux which are reflected on the information recording planes of the first optical information recording medium and the second optical information recording medium; and an optical detector to receive both of the first light flux and the second light flux which are reflected on the information recording planes of the first optical information recording medium and the second optical information recording medium, wherein both optical surfaces of the output angle conversion element are refractive surfaces, and wherein the at least one optical surface of the objective optical element comprises a step structure in which patterns are arranged to be in a form of concentric circles whose center is on an optical axis of the objective optical element and the following formula is satisfied:

$$1 \times \lambda 2/(n2-1) \leq d \leq 2 \times \lambda 1/(n1-1),$$

wherein d represents an average depth of the step structures, n1 represents a refraction index of the objective optical element for the first light flux, and n2 represents a refraction index of the objective optical element for the second light flux.

* * * * *